US011501242B2

(12) United States Patent
Staples

(10) Patent No.: US 11,501,242 B2
(45) Date of Patent: *Nov. 15, 2022

(54) CONFIDENCE RATINGS FOR DELIVERY OF ITEMS

(71) Applicant: United Parcel Service of America, Inc., Atlanta, GA (US)

(72) Inventor: Jay Christian Staples, Duluth, GA (US)

(73) Assignee: UNITED PARCEL SERVICE OF AMERICA, INC., Atlanta, GA (US)

(*) Notice: Subject to any disclaimer, the term of this patent is extended or adjusted under 35 U.S.C. 154(b) by 572 days.

This patent is subject to a terminal disclaimer.

(21) Appl. No.: 16/572,036

(22) Filed: Sep. 16, 2019

(65) Prior Publication Data

US 2020/0118059 A1 Apr. 16, 2020

Related U.S. Application Data

(63) Continuation of application No. 14/315,665, filed on Jun. 26, 2014, now Pat. No. 10,417,601.

(60) Provisional application No. 61/840,983, filed on Jun. 28, 2013.

(51) Int. Cl.
  *G06Q 10/08* (2012.01)
(52) U.S. Cl.
  CPC .................................. *G06Q 10/083* (2013.01)
(58) Field of Classification Search
  None
  See application file for complete search history.

(56) References Cited

U.S. PATENT DOCUMENTS

| | | | |
|---|---|---|---|
| 3,956,740 A | 5/1976 | Jones et al. |
| 4,408,782 A | 10/1983 | Condon |
| 4,832,204 A | 5/1989 | Handy et al. |
| 4,850,009 A | 7/1989 | Zook et al. |
| 5,014,206 A | 5/1991 | Scribner et al. |
| 5,227,614 A | 7/1993 | Danielson et al. |
| 5,292,004 A | 3/1994 | Cesarini |
| 5,313,051 A | 5/1994 | Brigida et al. |
| 5,325,303 A | 6/1994 | Walz et al. |
| 5,347,274 A | 9/1994 | Hassett |

(Continued)

OTHER PUBLICATIONS

Cliff Aliperti, "When the USPS Confirms Delivery Sometimes There is Nothing There", https://web.archive.org/web/20130617200815/https://immortalephemera.com/8970/usps-delivery-confirmation-and-missing-packages/, Jun. 17, 2013, retrieved Mar. 13, 2022 (Year: 2013).*

*Primary Examiner* — George Chen
(74) *Attorney, Agent, or Firm* — Shook, Hardy & Bacon L.L.P.

(57) ABSTRACT

Computer program products, methods, systems, apparatus, and computing entities for determining/identifying confidence ratings/indicators for delivery of items. In one embodiment, this comprises determining a number of location events that occurred within a zone of confidence for delivery an item to a serviceable address; and responsive to determining the number of location events that occurred within the zone of confidence for delivery the item to the serviceable address, determining, via one or more processors, a confidence rating for delivery of the item to the serviceable address based at least in part on the number of location events that occurred within the zone of confidence.

20 Claims, 11 Drawing Sheets

(56) References Cited

U.S. PATENT DOCUMENTS

| | | |
|---|---|---|
| 5,375,226 A | 12/1994 | Sano et al. |
| 5,444,444 A | 8/1995 | Ross |
| 5,472,097 A | 12/1995 | Villachica |
| 5,496,992 A | 3/1996 | Madan et al. |
| 5,497,149 A | 3/1996 | Fast |
| 5,500,516 A | 3/1996 | Durbin |
| 5,506,580 A | 4/1996 | Whiting et al. |
| 5,528,758 A | 6/1996 | Yeh |
| 5,532,694 A | 7/1996 | Mayers et al. |
| 5,534,684 A | 7/1996 | Danielson |
| 5,593,267 A | 1/1997 | McDonald et al. |
| 5,635,693 A | 6/1997 | Benson et al. |
| 5,648,770 A | 7/1997 | Ross |
| 5,650,967 A | 7/1997 | Seibert |
| 5,682,379 A | 10/1997 | Mahany et al. |
| 5,736,725 A | 4/1998 | Danielson |
| 5,751,973 A | 5/1998 | Hassett |
| 5,764,774 A | 6/1998 | Liu |
| 5,770,841 A | 6/1998 | Moed et al. |
| 5,778,377 A | 7/1998 | Marlin et al. |
| 5,780,778 A | 7/1998 | Schwartz et al. |
| 5,790,429 A | 8/1998 | Baker et al. |
| 5,797,134 A | 8/1998 | McMillan et al. |
| 5,805,416 A | 9/1998 | Friend et al. |
| 5,805,419 A | 9/1998 | Hundt et al. |
| 5,808,564 A | 9/1998 | Simms et al. |
| 5,822,739 A | 10/1998 | Kara |
| 5,834,749 A | 11/1998 | Durbin |
| 5,835,377 A | 11/1998 | Bush |
| 5,855,006 A | 12/1998 | Huemoeller et al. |
| 5,862,500 A | 1/1999 | Goodwin |
| 5,867,382 A | 2/1999 | McLaughlin |
| 5,869,819 A | 2/1999 | Knowles et al. |
| 5,884,238 A | 3/1999 | Noll et al. |
| 5,905,232 A | 5/1999 | Schwartz et al. |
| 5,919,239 A | 7/1999 | Fraker et al. |
| 5,948,040 A | 9/1999 | DeLorme et al. |
| 5,971,587 A | 10/1999 | Kato et al. |
| 5,992,753 A | 11/1999 | Xu |
| 5,993,098 A | 11/1999 | Osada |
| 5,995,118 A | 11/1999 | Masuda |
| 5,995,950 A | 11/1999 | Barns-Slavin et al. |
| 6,003,773 A | 12/1999 | Durbin et al. |
| 6,006,106 A | 12/1999 | Cook et al. |
| 6,018,715 A | 1/2000 | Lynch et al. |
| 6,034,379 A | 3/2000 | Bunte et al. |
| 6,061,398 A | 5/2000 | Satoh et al. |
| 6,064,970 A | 5/2000 | McMillan et al. |
| 6,071,643 A | 6/2000 | Chino et al. |
| 6,084,528 A | 7/2000 | Beach et al. |
| 6,124,806 A | 9/2000 | Cunningham et al. |
| 6,134,437 A | 10/2000 | Karabinis et al. |
| 6,148,262 A | 11/2000 | Fry |
| 6,173,209 B1 | 1/2001 | Laval et al. |
| 6,175,826 B1 | 1/2001 | Malandra, Jr. et al. |
| 6,182,053 B1 | 1/2001 | Rauber et al. |
| 6,189,702 B1 | 2/2001 | Bonnet |
| 6,208,980 B1 | 3/2001 | Kara |
| 6,211,781 B1 | 4/2001 | McDonald |
| 6,232,915 B1 | 5/2001 | Dean et al. |
| 6,241,099 B1 | 6/2001 | Hendrickson et al. |
| 6,246,672 B1 | 6/2001 | Lumelsky |
| 6,249,008 B1 | 6/2001 | Bunte et al. |
| 6,266,612 B1 | 7/2001 | Dussell et al. |
| 6,285,916 B1 | 9/2001 | Kadaba et al. |
| 6,329,919 B1 | 12/2001 | Boies et al. |
| 6,332,098 B2 | 12/2001 | Ross et al. |
| 6,408,233 B1 | 6/2002 | Solomon et al. |
| 6,433,732 B1 | 8/2002 | Dutta et al. |
| 6,459,969 B1 | 10/2002 | Bates et al. |
| 6,493,550 B1 | 12/2002 | Raith |
| 6,496,775 B2 | 12/2002 | McDonald, Jr. et al. |
| 6,529,786 B1 | 3/2003 | Sim |
| 6,532,152 B1 | 3/2003 | White et al. |
| 6,571,197 B1 | 5/2003 | Frank et al. |
| 6,648,770 B1 | 11/2003 | Snyder |
| 6,731,940 B1 | 5/2004 | Nagendran |
| 6,745,027 B2 | 6/2004 | Twitchell, Jr. |
| 6,749,122 B1 | 6/2004 | Koenck et al. |
| 6,756,918 B2 | 6/2004 | Fomukong |
| 6,801,850 B1 | 10/2004 | Wolfson |
| 6,816,784 B1 | 11/2004 | Khan et al. |
| 6,819,267 B1 | 11/2004 | Edmark et al. |
| 6,868,386 B1 | 3/2005 | Henderson et al. |
| 6,885,991 B2 | 4/2005 | Skonberg et al. |
| 6,889,194 B1 | 5/2005 | Kadaba |
| 6,895,329 B1 | 5/2005 | Wolfson |
| 6,934,634 B1 | 8/2005 | Ge |
| 6,990,409 B2 | 1/2006 | Khan et al. |
| 7,034,683 B2 | 4/2006 | Ghazarian |
| 7,039,496 B2 | 5/2006 | Perez et al. |
| 7,076,505 B2 | 7/2006 | Campbell |
| 7,118,034 B2 | 10/2006 | Baldassari et al. |
| 7,324,666 B2 | 1/2008 | Zoken et al. |
| 7,366,919 B1 | 4/2008 | Sobel et al. |
| 7,421,311 B2 | 9/2008 | Perez et al. |
| 7,489,240 B2 | 2/2009 | Soliman |
| 7,660,666 B2 | 2/2010 | Finn et al. |
| 7,797,104 B2 | 9/2010 | Finn et al. |
| 7,840,340 B2 | 11/2010 | Graham et al. |
| 7,868,753 B2 | 1/2011 | Jenkins et al. |
| 7,953,547 B2 | 5/2011 | Graham et al. |
| 8,065,076 B2 | 11/2011 | Graham et al. |
| 2001/0005171 A1 | 6/2001 | Farringdon et al. |
| 2002/0006806 A1 | 1/2002 | Kinnunen et al. |
| 2002/0010604 A1 | 1/2002 | Block |
| 2002/0024448 A1 | 2/2002 | Olesen |
| 2002/0044084 A1 | 4/2002 | Itoh et al. |
| 2002/0065065 A1 | 5/2002 | Lunsford et al. |
| 2002/0077060 A1 | 6/2002 | Lehikoinen et al. |
| 2002/0082931 A1 | 6/2002 | Siegel et al. |
| 2002/0085515 A1 | 7/2002 | Jaynes et al. |
| 2002/0132632 A1 | 9/2002 | Brassil et al. |
| 2002/0133437 A1 | 9/2002 | Ansley |
| 2002/0137472 A1 | 9/2002 | Quinn et al. |
| 2002/0156661 A1 | 10/2002 | Jones et al. |
| 2003/0010822 A1 | 1/2003 | Davies et al. |
| 2003/0040946 A1 | 2/2003 | Sprenger et al. |
| 2003/0055689 A1 | 3/2003 | Block et al. |
| 2003/0055690 A1 | 3/2003 | Garback |
| 2003/0083060 A1 | 5/2003 | Menendez |
| 2003/0109266 A1 | 6/2003 | Rafiah et al. |
| 2003/0114206 A1 | 6/2003 | Timothy et al. |
| 2003/0120526 A1 | 6/2003 | Altman et al. |
| 2003/0144985 A1 | 7/2003 | Ebert |
| 2003/0163287 A1 | 8/2003 | Vock et al. |
| 2003/0224818 A1 | 12/2003 | Nagasaka et al. |
| 2004/0138817 A1 | 7/2004 | Zoken et al. |
| 2004/0139049 A1 | 7/2004 | Hancock et al. |
| 2004/0243452 A1 | 12/2004 | Barton et al. |
| 2004/0249557 A1 | 12/2004 | Harrington et al. |
| 2005/0137933 A1 | 6/2005 | Holsen et al. |
| 2006/0164232 A1 | 7/2006 | Waterhouse et al. |
| 2007/0008129 A1 | 1/2007 | Soliman |
| 2007/0285227 A1 | 12/2007 | Timothy et al. |
| 2010/0094688 A1* | 4/2010 | Olsen, III ............ G06Q 10/04 705/7.42 |
| 2011/0208751 A1* | 8/2011 | Graham ............... G08G 1/20 707/748 |
| 2013/0304349 A1 | 11/2013 | Davidson |
| 2015/0006429 A1 | 1/2015 | Staples |

\* cited by examiner

| SERVICEABLE ADDRESS |
|---|
| STREET NUMBER |
| STREET NAME |
| CITY |
| COUNTY |
| STATE |
| ZIP CODE |
| COUNTRY |
| ADDRESS TYPE |
| AVERAGE REFERENCE POINT(S) LAT / LONG |
| STREET NETWORK CONNECTION POINT(S) LAT / LONG |
| FREIGHT DELIVERY POINT(S) LAT / LONG |
| PACKAGE DELIVERY POINT(S) LAT / LONG |
| LETTER DELIVERY POINT(S) LAT / LONG |
| ACCESS POINT(S) LAT / LONG |
| PARKING POINT(S) LAT / LONG |
| FRONT DOOR POINT(S) LAT / LONG |
| BACK DOOR POINT(S) LAT / LONG |
| SIDE DOOR POINT(S) LAT / LONG |

Fig. 10

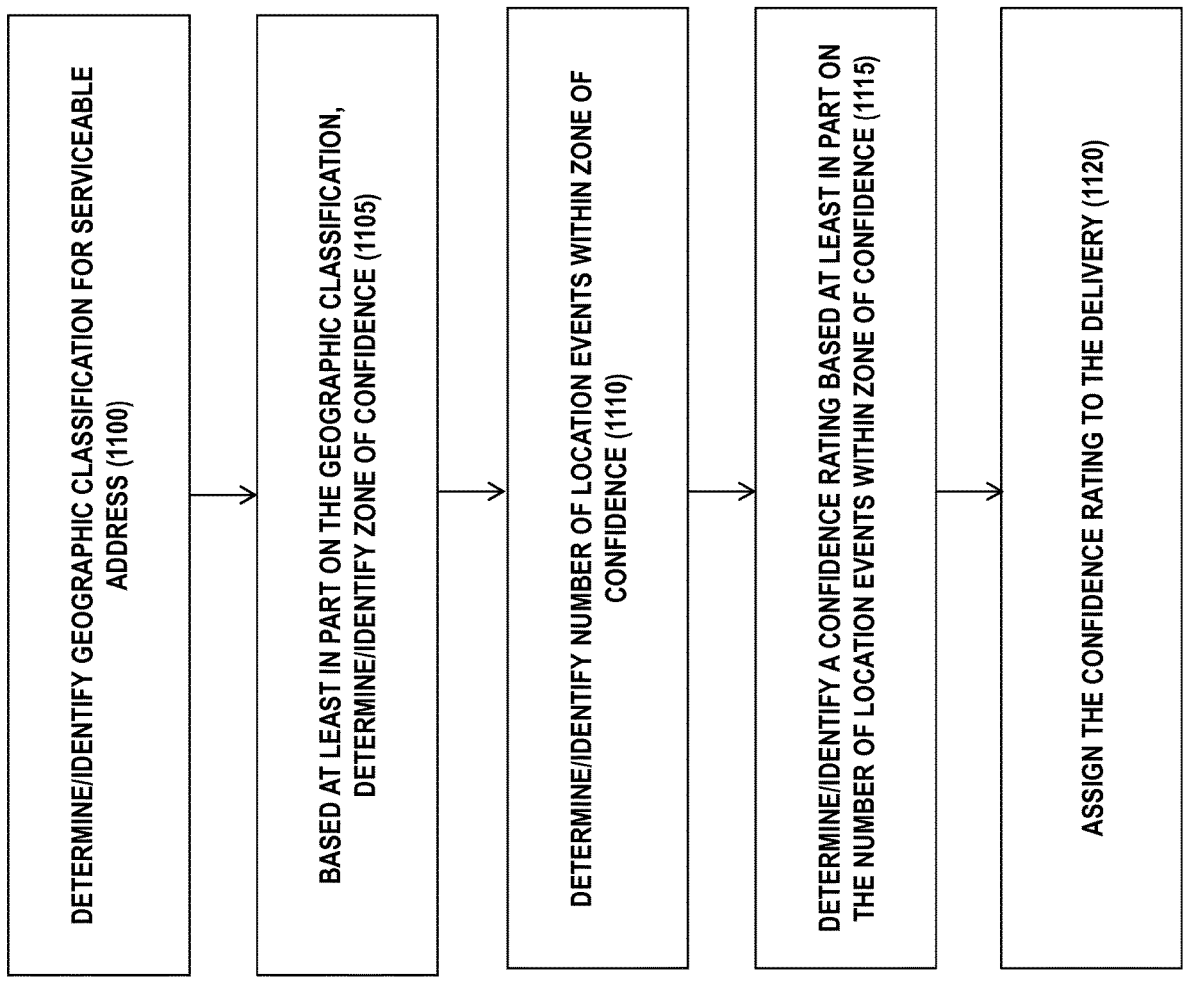

CONFIDENCE RATINGS FOR DELIVERY OF ITEMS

CROSS-REFERENCE TO RELATED APPLICATIONS

This Application is a Continuation Application of U.S. patent Non-Provisional application Ser. No. 14/315,665 filed Jun. 26, 2017 which in turn claims priority to U.S. Provisional Application No. 61/840,983 filed Jun. 28, 2013, which is hereby incorporated herein in its entirety by reference.

BACKGROUND

With the explosion of ecommerce transactions, customers and retailers often want further confirmation that items that have been ordered were properly delivery to the intended delivery addresses.

BRIEF SUMMARY

In general, embodiments of the present invention provide methods, apparatus, systems, computing devices, computing entities, and/or the like for determining a confidence rating.

In accordance with one aspect, a method for determining a confidence rating/indicator is provided. In one embodiment, the method comprises (1) determining the number of location events that occurred within a zone of confidence for delivery an item to a serviceable address; and (2) responsive to determining the number of location events that occurred within the zone of confidence for delivery the item to the serviceable address, determining a confidence rating/indicator for delivery of the item to the serviceable address based at least in part on the number of location events that occurred within the zone of confidence.

In accordance with another aspect, a computer program product for determining a confidence rating/indicator is provided. The computer program product may comprise at least one computer-readable storage medium having computer-readable program code portions stored therein, the computer-readable program code portions comprising executable portions configured to (1) determine the number of location events that occurred within a zone of confidence for delivery an item to a serviceable address; and (2) responsive to determining the number of location events that occurred within the zone of confidence for delivery the item to the serviceable address, determine a confidence rating/indicator for delivery of the item to the serviceable address based at least in part on the number of location events that occurred within the zone of confidence.

In accordance with yet another aspect, an apparatus comprising at least one processor and at least one memory including computer program code is provided. In one embodiment, the at least one memory and the computer program code may be configured to, with the processor, cause the apparatus to (1) determine the number of location events that occurred within a zone of confidence for delivery an item to a serviceable address; and (2) responsive to determining the number of location events that occurred within the zone of confidence for delivery the item to the serviceable address, determine a confidence rating/indicator for delivery of the item to the serviceable address based at least in part on the number of location events that occurred within the zone of confidence.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 5-10 illustrate exemplary input and output in accordance with various embodiments of the present invention.

FIG. 11 is a flowchart illustrating operations and processes that can be used in accordance with various embodiments of the present invention.

DETAILED DESCRIPTION

Figure 1:
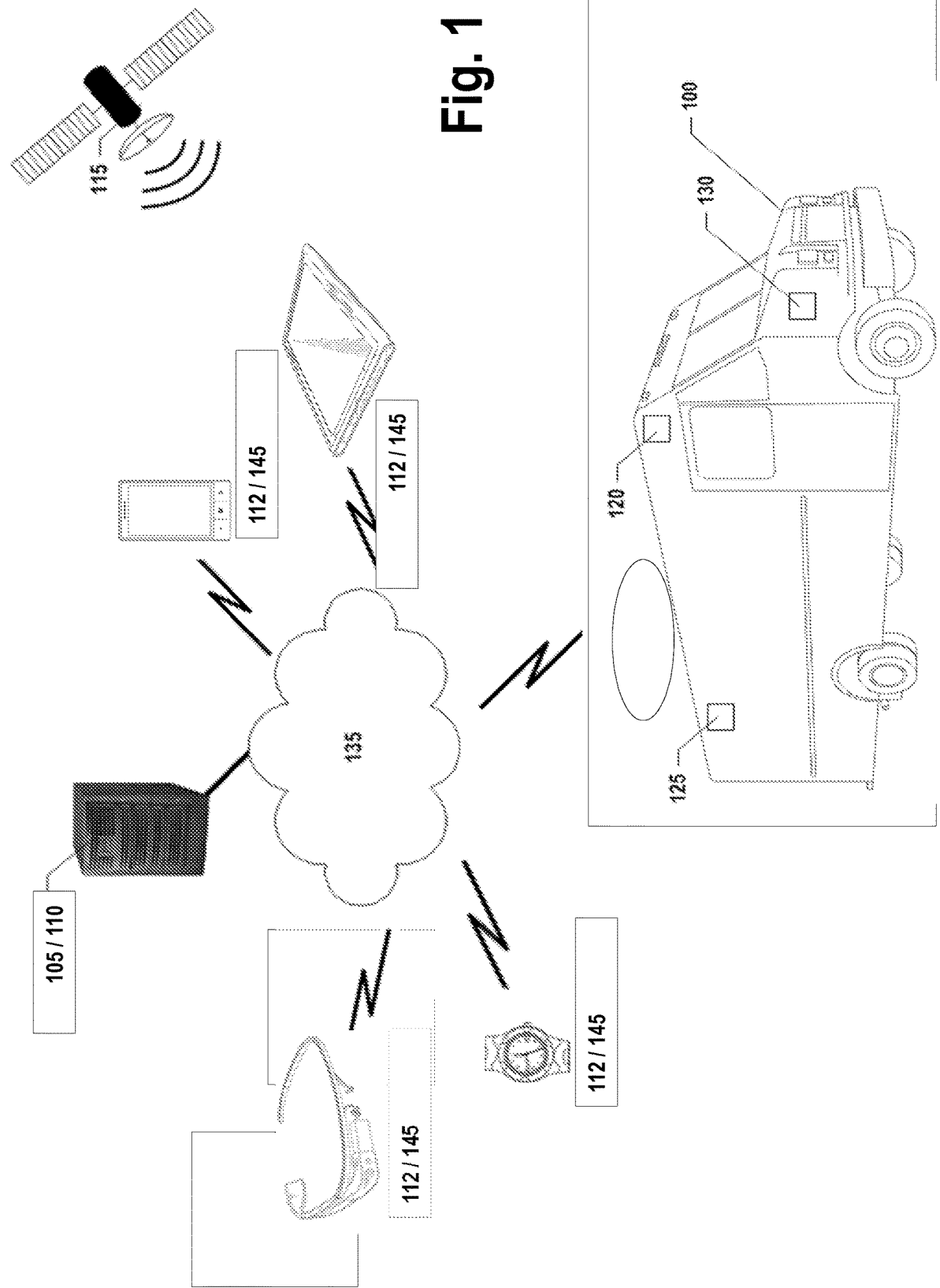
FIG. 1 is a diagram of a system that can be used to practice various embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and/or similar words used interchangeably (e.g., the executable instructions, instructions for execution, program code, and/or the like) on a computer-readable storage medium for execution.

For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary Architecture

The system may include one or more vehicles 100, one or more retailer computing entities 105, one or more carrier computing entities 110, one or more customer computing entities 112, one or more Global Positioning System (GPS) satellites 115, one or more networks 135, one or more mobile computing entities 145, and/or the like. Each of these components, entities, devices, systems, and/or similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

a. Exemplary Vehicle

In various embodiments, the term vehicle 100 is used generically. For example, a vehicle 100 may be a tractor, a truck, a car, a motorcycle, a moped, a Segway, a bicycle, a golf cart, a hand truck, a cart, a trailer, a tractor and trailer combination, a van, a flatbed truck, a vehicle, drone, airplane, helicopter, and/or any other form of object for moving or transporting people and/or items/shipments (e.g., one or more packages, parcels, bags, containers, loads, crates, items/shipments banded together, vehicle parts, pallets, drums, the like, and/or similar words used herein interchangeably). Although in certain embodiments, the vehicle may be unmanned. In one embodiment, each vehicle 100 may be associated with a unique vehicle identifier (such as a vehicle ID) that uniquely identifies the vehicle 100. The unique vehicle ID (e.g., trailer ID, tractor ID, vehicle ID, and/or the like) may include characters, such as numbers, letters, symbols, and/or the like. For example, an alphanumeric vehicle ID (e.g., "AS445") may be associated with each vehicle 100. In another embodiment, the unique vehicle ID may be the license plate, registration number, or other identifying information/data assigned to or associated with the vehicle 100.

Figure 2:
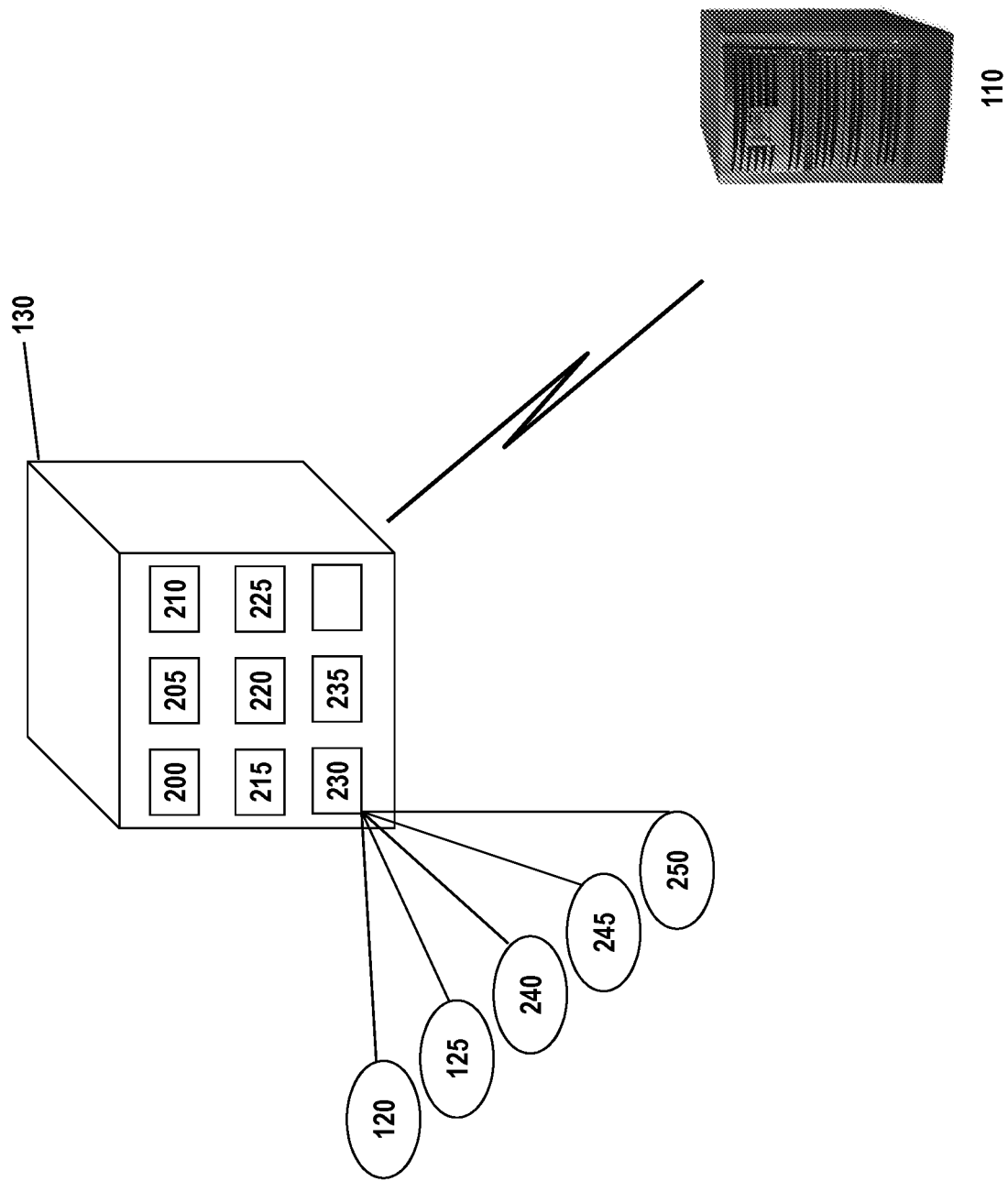
FIG. 2 is a diagram of a information/data collection entity that may be used in association with certain embodiments of the present invention.

FIG. 1 shows one or more computing entities, devices, and/or similar words used herein interchangeably that are associated with the vehicle 100, such as a information/data collection entity 130 or other computing entities. In general, the terms computing entity, entity, device, system, and/or similar words used herein interchangeably may refer to, for example, one or more computers, computing entities, mobile phones, desktops, tablets, notebooks, laptops, distributed systems, gaming consoles (e.g., Xbox, Play Station, Wii), watches, televisions, dongles, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. FIG. 2 provides a block diagram of an exemplary information/data collection entity 130 that may be attached, affixed, disposed upon, integrated into, or part of a vehicle 100. The information/data collection entity 130 may collect telematics information/data (including location information/data) and transmit/send the information/data to the mobile computing entity 145, the carrier computing entity 110, and/or various other computing entities via one of several communication methods.

In one embodiment, the information/data collection entity 130 may include, be associated with, or be in communication with one or more processors 200 (various exemplary processors are described in greater detail below), one or more location-determining devices or one or more location sensors 120 (e.g., Global Navigation Satellite System (GNSS) sensors), one or more telematics sensors 125, one or more real-time clocks 215, a J-Bus protocol architecture, one or more electronic control modules (ECM) 245, one or more communication ports 230 for receiving telematics information/data from various sensors (e.g., via a CAN-bus), one or more communication ports 205 for transmitting/sending information/data, one or more RFID tags/sensors 250, one or more power sources 220, one or more information/data radios 235 for communication with a variety of communication networks, one or more memory modules 210, and one or more programmable logic controllers (PLC) 225. It should be noted that many of these components may be located in the vehicle 100 but external to the information/data collection entity 130.

In one embodiment, the one or more location sensors 120, modules, or similar words used herein interchangeably may be one of several components in communication with or available to the information/data collection entity 130. Moreover, the one or more location sensors 120 may be compatible with GPS satellites 115, such as Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, triangulation may be used in connection with a device associated with a particular vehicle and/or the vehicle's operator and with various communication points (e.g., cellular towers or Wi-Fi access points) positioned at various locations throughout a geographic area to monitor the location of the vehicle 100 and/or its operator. The one or more location sensors 120 may be used to receive latitude, longitude, altitude, heading or direction, geocode, course, position, time, and/or speed information/data (e.g., referred to herein as telematics information/data and further described herein below). The one or more location sensors 120 may also communicate with the carrier computing entity 110, the information/data collection entity 130, mobile computing entity 145, and/or similar computing entities.

As indicated, in addition to the one or more location sensors 120, the information/data collection entity 130 may include and/or be associated with one or more telematics sensors 125, modules, and/or similar words used herein interchangeably. For example, the telematics sensors 125 may include vehicle sensors, such as engine, fuel, odometer, hubometer, tire pressure, location, weight, emissions, door, and speed sensors. The telematics information/data may include, but is not limited to, speed information/data, emissions information/data, RPM information/data, tire pressure information/data, oil pressure information/data, seat belt usage information/data, distance information/data, fuel information/data, idle information/data, and/or the like (e.g., referred to herein as telematics information/data). The telematics sensors 125 may include environmental sensors, such as air quality sensors, temperature sensors, and/or the like. Thus, the telematics information/data may also include carbon monoxide (CO), nitrogen oxides (NOx), sulfur oxides (SOx), Ethylene Oxide (EtO), ozone ($O_3$), hydrogen sulfide ($H_2S$) and/or ammonium ($NH_4$) information/data, and/or meteorological information/data (e.g., referred to herein as telematics information/data).

In one embodiment, the ECM 245 may be one of several components in communication with and/or available to the information/data collection entity 130. The ECM 245, which may be a scalable and subservient device to the information/data collection entity 130, may have information/data processing capability to decode and store analog and digital inputs from vehicle systems and sensors. The ECM 245 may further have information/data processing capability to collect and present telematics information/data to the J-Bus (which may allow transmission to the information/data collection entity 130), and output standard vehicle diagnostic codes when received from a vehicle's J-Bus-compatible on-board controllers 240 and/or sensors.

As indicated, a communication port 230 may be one of several components available in the information/data collection entity 130 (or be in or as a separate computing entity). Embodiments of the communication port 230 may include an Infrared information/data Association (IrDA) communication port, a information/data radio, and/or a serial port. The communication port 230 may receive instructions for the information/data collection entity 130. These instructions may be specific to the vehicle 100 in which the information/data collection entity 130 is installed, specific to the geographic area in which the vehicle 100 will be traveling, specific to the function the vehicle 100 serves within a fleet, and/or the like. In one embodiment, the information/data radio 235 may be configured to communicate with a wireless wide area network (WWAN), wireless local area network (WLAN), wireless personal area network (WPAN), or any combination thereof. For example, the information/data radio 235 may communicate via various wireless protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols (including Bluetooth low energy (BLE)), wireless universal serial bus (USB) protocols, and/or any other wireless protocol.

b. Exemplary Carrier Computing Entity

Figure 3:
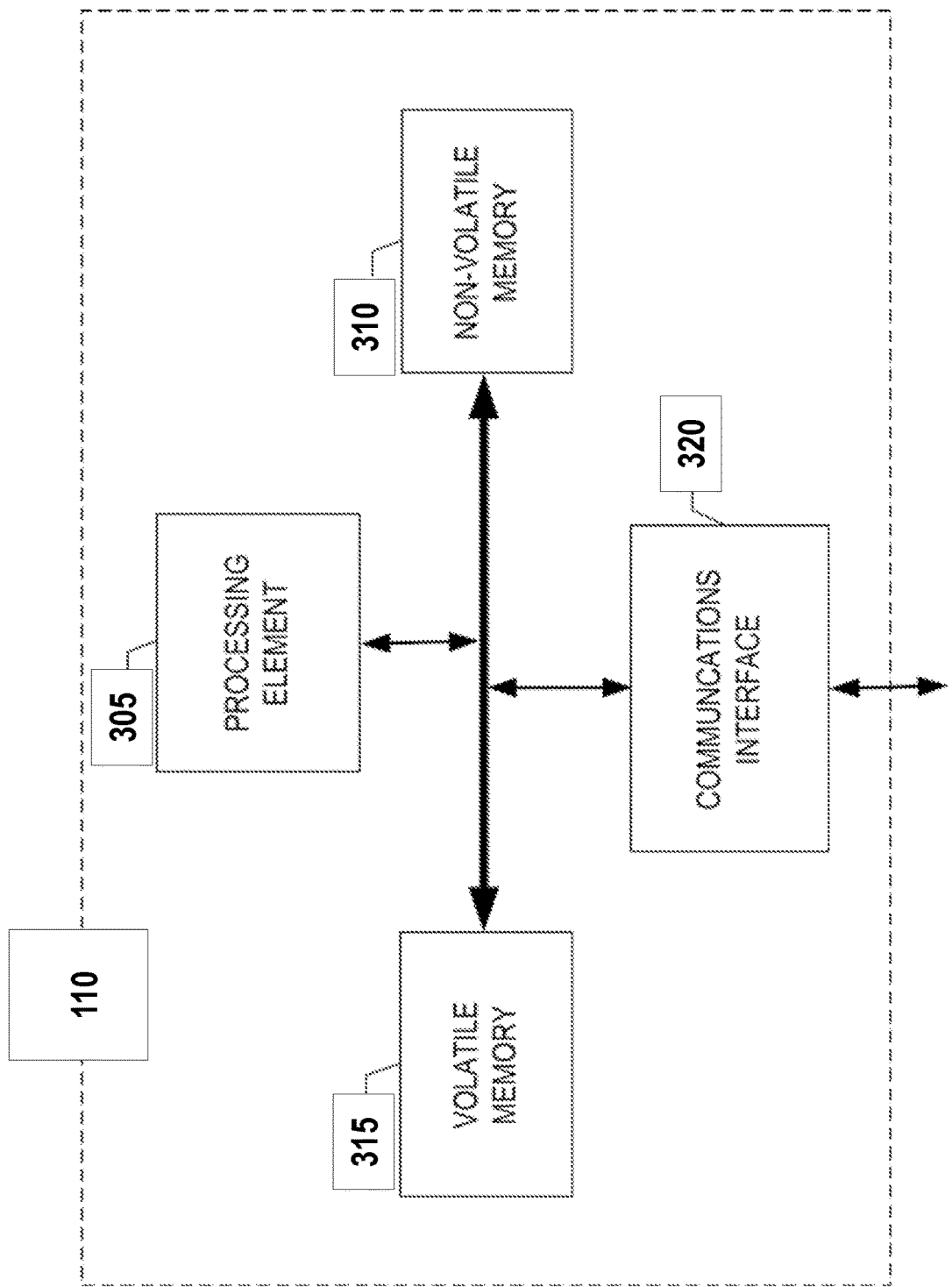
FIG. 3 is a schematic of a carrier computing entity in accordance with certain embodiments of the present invention.

A carrier may be a traditional carrier, such as United Parcel Service of America, Inc., FedEx, DHL, courier services, the United States Postal Service, Canadian Post, and/or the like. However, a carrier may also be a nontraditional carrier, such as Amazon, Google, Uber, ride-sharing services, Macy's, and/or the like. FIG. 3 provides a schematic of a carrier computing entity 110 according to one embodiment of the present invention. In general, the terms computing entity, entity, device, system, and/or similar words used herein interchangeably may refer to, for example, one or more computers, computing entities, mobile phones, desktops, tablets, notebooks, laptops, distributed systems, gaming consoles (e.g., Xbox, Play Station, Wii), watches, glasses, key fobs, RFID tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on information/data, content, information, and/or similar terms used herein interchangeably.

As indicated, in one embodiment, the carrier computing entity 110 may also include one or more communications interfaces 320 for communicating with various computing entities, such as by communicating information/data, content, information, and/or similar terms used herein interchangeably that can be transmitted, received, operated on, processed, displayed, stored, and/or the like. For instance, the carrier computing entity 110 may communicate with vehicles 100, mobile computing entities 145, and/or the like.

As shown in FIG. 3, in one embodiment, the carrier computing entity 110 may include or be in communication with one or more processing elements 305 (also referred to as processors, processing circuitry, and/or similar terms used herein interchangeably) that communicate with other elements within the carrier computing entity 110 via a bus, for example. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present invention when configured accordingly.

In one embodiment, the carrier computing entity 110 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 310 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, information/data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the carrier computing entity 110 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, information/data, applications, programs, program modules, scripts, source code, object code, byte code, compiled code, interpreted code, machine code, executable instructions, and/or the like being executed by, for example, the processing element 305. Thus, the databases, database instances, database management system entities, information/data, applications, programs, program modules, scripts, source code, object code, byte code, compiled code, interpreted code, machine code, executable instructions, and/or the like may be used to control certain aspects of the operation of the carrier computing entity 110 with the assistance of the processing element 305 and operating system.

As indicated, in one embodiment, the carrier computing entity 110 may also include one or more communications interfaces 320 for communicating with various computing entities, such as by communicating information/data, content, information, and/or similar terms used herein interchangeably that can be transmitted, received, operated on, processed, displayed, stored, and/or the like. For instance, the carrier computing entity 110 may communicate with computing entities or communication interfaces of the vehicle 100, mobile computing entities 145, and/or the like.

Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the carrier computing entity 110 may be configured to communicate via wireless external communication networks using any of a variety of protocols, such as GPRS, UMTS, CDMA2000, 1xRTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol. Although not shown, the carrier computing entity 110 may include or be in communication with one or more input elements, such as a keyboard input, a mouse input, a touch screen/display input, audio input, pointing device input, joystick input, keypad input, and/or the like. The carrier computing entity 110 may also include or be in communication with one or more output elements (not shown), such as audio output, video output, screen/display output, motion output, movement output, and/or the like.

As will be appreciated, one or more of the carrier computing entity's 110 components may be located remotely from other carrier computing entity 110 components, such as in a distributed system. Furthermore, one or more of the components may be combined and additional components performing functions described herein may be included in the carrier computing entity 110. Thus, the carrier computing entity 110 can be adapted to accommodate a variety of needs and circumstances.

c. Exemplary Mobile Computing Entity

Figure 4:
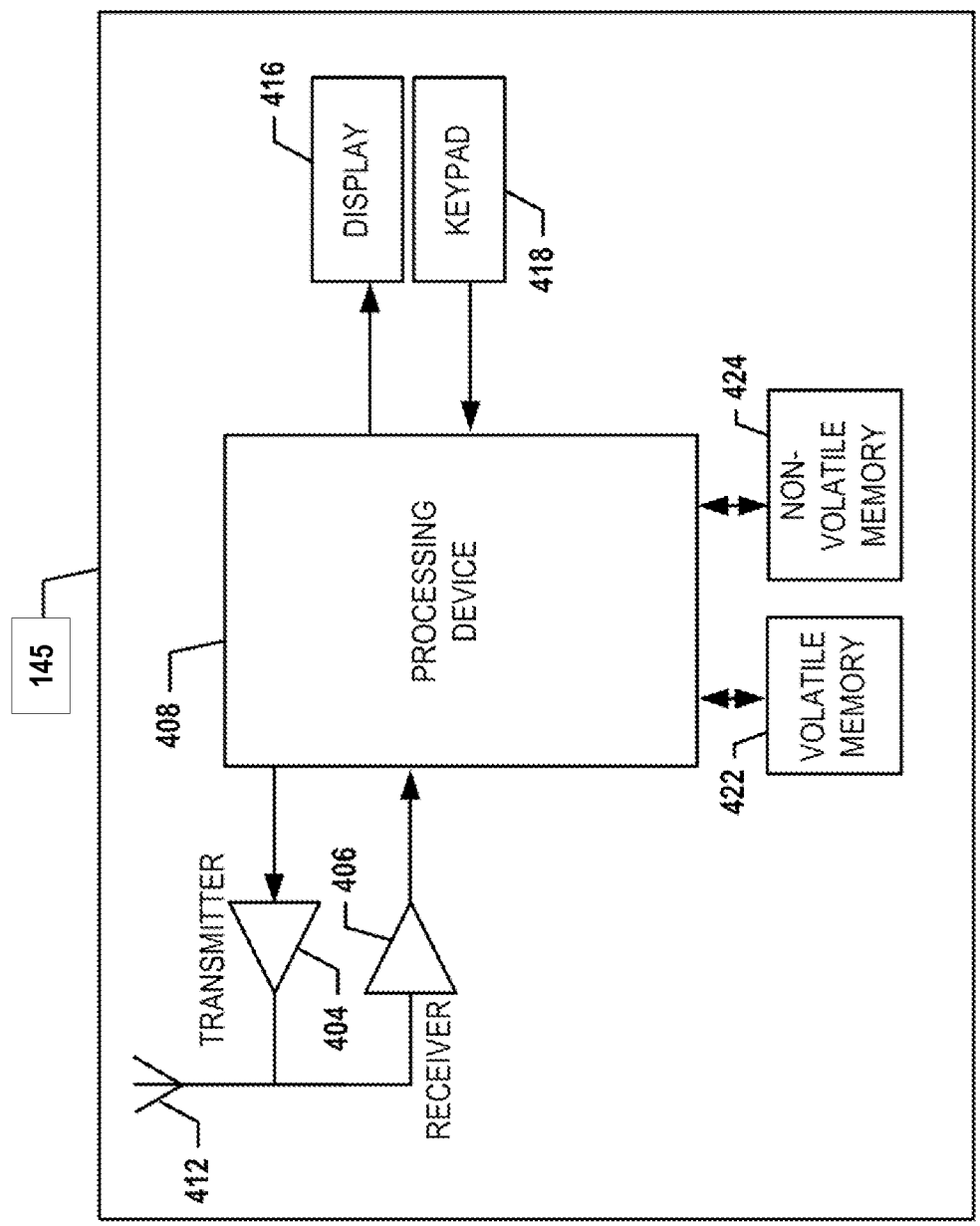
FIG. 4 is a schematic of a mobile computing entity in accordance with certain embodiments of the present invention.

FIG. 4 provides an illustrative schematic representative of a mobile computing entity 145 that can be used in conjunction with embodiments of the present invention. Mobile computing entities 145 can be operated by various parties, including operators of vehicles 100 and other carrier/retailer/delivery personnel for using in transporting and delivering items/shipments in a carrier's transportation and logistics network. As shown in FIG. 4, a mobile computing entity 145 can include an antenna 412, a transmitter 404 (e.g., radio), a receiver 406 (e.g., radio), and a processing element 408 that provides signals to and receives signals from the transmitter 404 and receiver 406, respectively.

The signals provided to and received from the transmitter 404 and the receiver 406, respectively, may include signaling information/data in accordance with an air interface standard of applicable wireless systems to communicate with various entities, such as vehicles 100, carrier computing entity 110, and/or the like. In this regard, the mobile computing entity 145 may be capable of operating with one or more air interface standards, communication protocols, modulation types, and access types. More particularly, the mobile computing entity 145 may operate in accordance with any of a number of wireless communication standards and protocols. In a particular embodiment, the mobile computing entity 145 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile computing entity 145 can communicate with various other entities using concepts such as Unstructured Supplementary Service information/data (US SD), Short Message Service (S MS), Multimedia Messaging Service (MMS), Dual-Tone Multi-Frequency Signaling (DTMF), and/or Subscriber Identity Module Dialer (SIM dialer). The mobile computing entity 145 can also download changes, add-ons, and updates, for instance, to its firmware, software (e.g., including executable instructions, applications, program modules), and operating system.

According to one embodiment, the mobile computing entity 145 may include a location determining device and/or functionality. For example, the mobile computing entity 145 may include a GPS module adapted to acquire, for example, latitude, longitude, altitude, geocode, course, and/or speed data—referred to herein as telematics information/data, location information/data, and/or geocode samples. In one embodiment, the GPS module acquires information/data, sometimes known as ephemeris information/data, by identifying the number of satellites in view and the relative positions of those satellites 115.

The mobile computing entity 145 may also comprise a user interface (that can include a display 416 coupled to a processing element 408) and/or a user input interface (coupled to a processing element 408). The user input interface can comprise any of a number of devices allowing the mobile computing entity 145 to receive information/data, such as a keypad 418 (hard or soft), a touch display, voice or motion interfaces, or other input device. In embodiments including a keypad 418, the keypad 418 can include (or cause display of) the conventional numeric (0-9) and related keys (#, *), and other keys used for operating the mobile computing entity 145 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile computing entity 145 can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database carrier computing entities, information/data, applications, programs, program modules, scripts, source code, object code, byte code, compiled code, interpreted code, machine code, executable instructions, and/or the like to implement the functions of the mobile computing entity 145.

d. Exemplary Retailer Computing Entity

In one embodiment, a retailer may be any entity selling, purchasing, and/or facilitating the sale or purchase of items. For example, retailers may include entities such as Amazon (www.amazon.com), Target (www.target.com), and/or the like, that operate one or more retailer computing entities 105 for conducting e-commerce. As previously noted, the term system may refer to, for example, one or more computers, computing entities, mobile phones, desktops, tablets, notebooks, laptops, distributed systems, input terminals, servers, blades, gateways, switches, processing devices, processing entities, relays, routers, network access points, base stations, the like, and/or any combination of devices or entities adapted to perform the functions, operations, and/or processes described herein. In one embodiment, the retailer computing entity 105 may include one or more components that are functionally similar to those of the carrier computing entity 110 and/or the mobile computing entity 145. For example, in one embodiment, the retailer computing entity 105 may include one or more processing elements, one or more display device/input devices, volatile and non-volatile storage or memory, and/or one or more communications interfaces.

e. Exemplary Customer Computing Entity

A customer may be an individual, a family, a company, an organization, an entity, a department within an organization, a representative of an organization and/or person, and/or the like purchasing or selling items/shipments via a retailer. To do so, a customer may operate a customer computing entity 112 that includes one or more components that are functionally similar to those of the retailer computing entity 105, carrier computing entity 110, mobile computing entity 145, and/or the like. For example, in one embodiment, each customer computing entity 112 may include one or more processing elements, one or more display device/input devices, volatile and non-volatile storage or memory, and/or one or more communications interfaces. These architectures are provided for exemplary purposes only and are not limiting to the various embodiments. The term computing device may refer to one or more computers, computing entities, mobile phones, desktops, tablets, notebooks, laptops, distributed systems, watches, glasses, key fobs, RFID tags, ear pieces, scanners, cameras, wristbands, kiosks, input terminals, servers, blades, gateways, switches, processing devices, processing entities, relays, routers, network access points, base stations, the like, and/or any combination of devices or entities adapted to perform the functions, operations, and/or processes described herein. As will be recognized, the customer computing entity 112 may include a web browser that allows the customer to purchase items/shipments via a retailer computing entity 105.

III. Exemplary Operation

Reference will now be made to FIGS. 5-11. FIGS. 5-10 illustrate exemplary input and output in accordance with various embodiments of the present invention. FIG. 11 is a flowchart illustrating operations and processes that can be used in accordance with various embodiments of the present invention.

In one embodiment, the described operations and processes can be used to determine whether an item/shipment has been appropriately delivered a customer (e.g., a consignee). For example, a customer (e.g., operating customer computing entity 112) may access a retailer computing entity 105 (e.g., Amazon (www.amazon.com), Target (www.target.com), and/or the like) and purchase an item/shipment to be delivered to the customer. The retailer (e.g., via the retailer computing entity 105) can then effect shipment of the item/shipment. An item/shipment may be one or more packages, parcels, bags, containers, loads, crates, items/shipments banded together, vehicle parts, pallets, drums, the like, and/or similar words used herein interchangeably. The carrier can transport the item/shipment to the customer and track the movements of the item/shipment through the carrier's transportation and logistics network.

In one embodiment, to track the movement of the item/shipment through the carrier's transportation and logistics network, the carrier computing entity 110 can store information/data about the item/shipment being transported, such as the weight of the shipment, the number of pieces in the shipment, the contents of the shipment, the class of the shipment, a geographic classification for the serviceable address (e.g., super urban, urban, suburban, rural, super rural), the date the item/shipment is picked up from the consignor, the date the item/shipment is to be delivered to the consignee, consignor information/data (e.g., name, address (which may be referred to herein as a serviceable address), and zip code of the consignor), consignee information/data (e.g., name, address (which may be referred to herein as a serviceable address), and zip code of the consignee), regulatory information/data such as UN Numbers (e.g., four-digit numbers that identify hazardous substances and articles), the delivery service level (e.g., ground, Air, etc.), and/or the like. Such information/data may be referred to herein as shipping information/data and/or similar words interchangeably.

In addition to or in combination with the above, the carrier computing entity 110 may associate or assign a unique identifier to the item/shipment, such as an alphanumeric identifier. Such item/shipment identifiers may be represented as text, barcodes, tags, character strings, Aztec Codes, MaxiCodes, information/data Matrices, Quick Response (QR) Codes, electronic representations, and/or the like. The unique item/shipment identifier (e.g., 123456789) may be used by the carrier to identify and track the item as it moves through the carrier's transportation network. Further, such item/shipment identifiers can be affixed to items by, for example, using a sticker (e.g., label) with the unique item/shipment identifier printed thereon (in human and/or machine readable form) or an RFID tag with the unique item/shipment identifier stored therein.

In one embodiment, as events occur that are related to the movement of a shipment, the carrier computing entity 110 can store such information/data (e.g., shipping information/data that includes location events 605) in association with a record for the shipment. The record may be accessible by item/shipment identifier, consignor information/data, consignee information/data, event location information/data, and/or the like. Such events may be location events identifying the location of the item/shipment at various points during the process of transporting the item/shipment through the carrier's transportation and logistics network, such as (1) scan events, (2) electronic signature capture events, (3) events indicating that the item/shipment has been delivered, (4) events indicating the mobile computing entity 145 captured a geocode sample; and/or (5) the like. To confirm whether the item/shipment was appropriately delivered, the following describes concepts for determining whether a sufficient number of location events have occurred within a zone of confidence for the appropriate serviceable address—indicating that the item/shipment was appropriately delivered to the customer.

a. Serviceable Addresses and Street Networks

In one embodiment, a "serviceable address" may be any identifiable location, such as one or more addresses, delivery locations, parking locations, sidewalks, highways, trails, alleys, paths, walkways, streets, street segments, entrance or exit ramps, roads, longitude and latitude points, geocodes, zip codes, area codes, cities, counties, states, provinces, countries, stops (e.g., pick up stops, delivery stops, vehicle visits, stops), geofenced areas, geographic areas, landmarks, buildings, bridges, and/or other identifiable locations. For example, a serviceable address may be a residential location, such as one or more homes, one or more mobile homes, one or more apartments, one or more apartment buildings, one or more condominiums, one or more townhomes, one or more points at such locations, and/or the like. The serviceable address may also be any specific location at a residential location, e.g., (e.g., front door of a residence, side door of a residence, and/or the like). A serviceable address may also be a commercial location, such as one or more stores in a mall, one or more office buildings, one or more office parks, one or more offices of an apartment complex, one or more garages, one or more warehouses, one or more restaurants, one or more stores, one or more retail locations, one or more points at such locations, and/or the like. The serviceable address may also be any specific location at a commercial location, e.g., (e.g., front door of a commercial, dock of a commercial location, and/or the like). A serviceable address may be one or more streets, one or more street segments, one or more zones, one or more areas, one or more latitude and/or longitude points (e.g., 33.7869128, -84.3875602), one or more geocodes, and/or the like. A serviceable address may be any identifiable location. As will be recognized, a variety of approaches and techniques can be used to adapt to various needs and circumstances.

In certain embodiments, serviceable addresses can be represented digitally in geographical maps as map information/data. Map information/data may include boundary, location, and attribute information/data corresponding to the various serviceable addresses and/or the like. As will be recognized, the map information/data can be stored using a variety of formats, layers, and/or the like—including shapefiles, ArcMaps, geodatabases, coverages, imagery, rasters, computer-aided drafting (CAD) files, other storage formats, and/or the like. For instance, the carrier computing entity 110 can appropriately store/record map information/data as a part of a digital map, e.g., as part of a feature layer, raster layer, service layer, geoprocessing layer, basemap layer, and/or the like.

Further, serviceable addresses can be represented in digital maps as being accessible by one or more street networks or street segments of a street network. A "street network" is collection of street segments that comprise navigable/traversable/travelable roads, streets, highways, paths, trails, walkways, entrance and exit ramps, bridges, sidewalks, alleys, and/or the like that can be used to access serviceable addresses. Similarly, serviceable addresses, street networks, and/or the like can be represented in digital maps as navigable/traversable/travelable segments or points for traveling to and/or from serviceable addresses. In one embodiment, a street network may be used to travel to serviceable addresses, with one or more serviceable address reference points 600 identifying locations at the serviceable addresses.

As will be recognized, digital maps (e.g., map information/data) may include various types of information/data about serviceable addresses and street networks, such as the longitude of street segments and/or serviceable addresses, the latitude of street segments and/or serviceable addresses, the altitude of street segments and/or serviceable addresses, the speed limits of street segments, direction restrictions for street segments, time penalties for street segments, and/or other information/data associated with street networks and serviceable addresses, and/or the like. For example, in one embodiment, a serviceable address may be represented by and/or associated with a longitude and latitude, a geocode, a nearest street segment, an address, and/or the like. Similarly, street segments of street networks may be represented by or associated with a street name, a segment identifier, a connecting node, an address, or address range, a series of longitude and latitude coordinates, and/or the like that define the overall shape and location of the street segment. As will be recognized, a variety of other approaches and techniques can be used to adapt to various needs and circumstances.

In one embodiment, the carrier computing entity 110 may store digital maps. In another embodiment, the carrier computing may be in communication with or associated with one or more mapping websites/servers/providers/databases (including providers such as maps.google.com, bing.com/maps, mapquest.com, Tele Atlas®, NAVTEQ®, and/or the like) that provide map information/data of digital maps to a variety of users and/or entities. Using the digital maps, an appropriate computing entity can provide map information/data, for example, about serviceable addresses (e.g., their locations, attributes, and/or the like) and/or their corresponding street networks based on map information/data. An appropriate computing entity can also provide map information/data, for example, about traveling to different serviceable addresses on the street networks. For instance, the map information/data may include a route for delivering one or more items to different serviceable addresses, the most efficient order for delivering items to the serviceable addresses, directions for traveling to and/or from the serviceable addresses, the estimated distance for traveling to and/or from the serviceable addresses, the expected time for traveling to and/or from the serviceable addresses, and/or the like. The term "route" is used generically to refer to any path traversed by a vehicle 100, person, animal, and/or the like. The map information/data may also include other information/data about serviceable addresses and/or traveling to and from serviceable addresses, such as current estimated speeds for associated street segments, historical speeds for associated street segments, nearest street segments, posted speed limits for associated street segments, interpolated locations of serviceable addresses, reverse geocoded locations of serviceable addresses, latitude and longitude points of serviceable addresses, distances between various serviceable addresses, directions, stop orders, and/or the like. Certain examples of these types of information/data are described in U.S. Publ. No. 2013-0304349, which is hereby incorporated in its entirety by reference.

In one embodiment, the carrier computing entity 110 can identify and/or retrieve map information/data associated with serviceable addresses and/or geographic areas. A geographic area may be one or more delivery routes, delivery locations, parking locations, sidewalks, highways, trails, alleys, paths, walkways, streets, routes, street segments, entrance or exit ramps, roads, zip codes, area codes, cities, counties, states, provinces, countries, and/or other identifiable locations.

In one embodiment, the carrier computing entity 110 can identify and/or retrieve other map information/data associated with serviceable addresses and/or geographic areas. In one example, the carrier computing entity 110 can identify, retrieve, or determine the interpolated or reverse geocoded locations on the street networks for one or more of the serviceable addresses shown in Table 2, for instance. Or, in another example, the carrier computing entity 110 can identify, retrieve, and/or reverse geocode the latitude and longitude points of the serviceable addresses if available, such as the location of 1 Street Address, Anytown, Ga. being located at 33.7869128, −84.3875602. As will be recognized, a variety of other techniques and approaches can be used to adapt to various needs and circumstances.

b. Points for Serviceable Addresses

Figure 5:
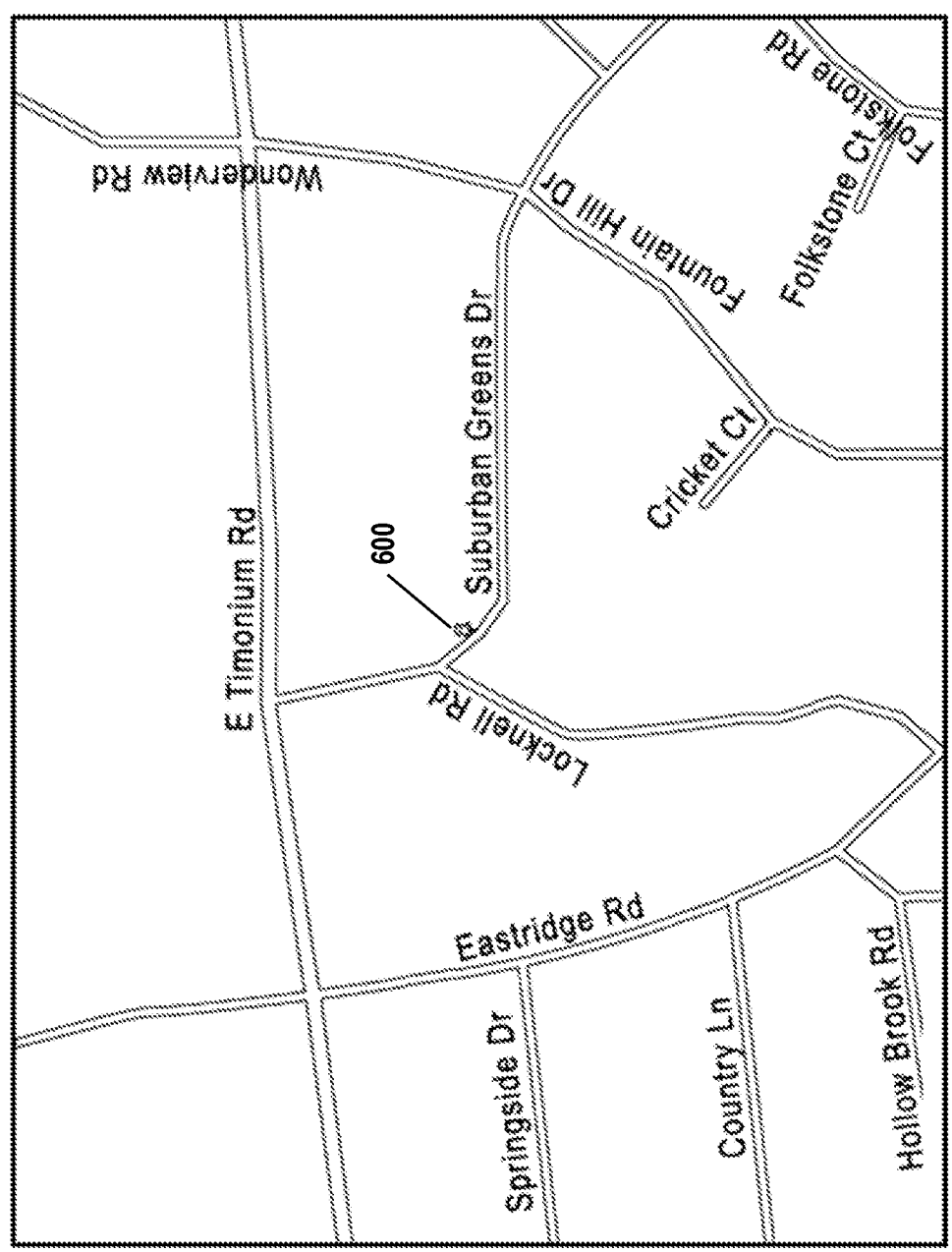

In one embodiment, each serviceable address may correspond to one or more points at the serviceable address, such as one or more serviceable address reference points 600 (shown in FIG. 5). Each serviceable address reference point 600 may include a corresponding reference geocode and/or longitude and latitude based on one or more collected geocode samples for the reference point. As used herein, the term geocode, longitude and latitude, and/or similar words used herein interchangeably may refer to a code or other rating/indicator that can be used to indicate a location in geographic space. For example, a geocode may indicate a location by specifying the latitude and longitude of a location. Thus, as will be recognized, one or more geocode samples may be made up of GPS records captured by a GPS or other sensor during the delivery of an item/shipment addressed to or the pickup of an item/shipment address from the serviceable address. With such collected information, the carrier computing entity 110 can compute a reference geocode for any serviceable address reference point 600 based on one or more geocode samples. This may involve calculating a reference latitude and a reference longitude using the latitude and longitude information/data from one or more geocode samples. By way of example, a reference geocode corresponding to a serviceable address reference point 600 for 105 Suburban Greens Drive, Center City, Ga. 11112 may be 33.78691262, −84.38756068. The reference geocode for this reference point 600 at the serviceable may be the average of the geocode samples collected for the serviceable address of 105 Suburban Greens Drive, Center City, Ga. 11112: (1) 33.7869128, −84.3875602; (2) 33.7869124, −84.3875610; (3) 33.7869121, −84.3875; (4) 33.7869123, −84.3875611; (5) 33.7869125, −84.3875613; (6) 33.7869128, −84.3875601; (7) 33.7869131, −84.3875603; (8) 33.7869130, −84.3875609; and (9) 33.7869126, −84.3875607.

In one embodiment, a serviceable address reference point 600 (and its corresponding reference geocode) may represent, for example, a location at which the serviceable address is accessible from the street network. Similarly, a serviceable address reference point 600 (and its corresponding reference geocode) may also represent an entry point or entrance to a parking area from a street network, an egress point or exit from a parking area to a street network, and/or the like. Further, a serviceable address reference point 600 (and its corresponding reference geocode) may represent a door point, such as a front door point, a back door point, and/or a side door point—identifying front, back, and/or side doors of a particular structure at a serviceable address. Yet further, a serviceable address reference point 600 (and its corresponding reference geocode) may represent a location where a driver of a delivery vehicle 100 can park when delivering an item/shipment (e.g., parking point) or the start of a driveway, private road, recreational area, and/or the like (e.g., access points). And yet further, serviceable address reference points 600 (and their corresponding reference geocodes) may represent a variety of other points, such as a freight delivery point, a package delivery point, and/or a letter delivery point—indicating the locations (e.g., driveway, door, house, or building) at which, for example, freight, packages, letters and/or the like are actually delivered with regard to a particular serviceable address. As will be recognized, a variety of other approaches and techniques can be used to adapt to various needs and circumstances.

As will be recognized, a serviceable address may only correspond to a single serviceable address reference point 600 (and corresponding reference geocode). In another embodiment, a serviceable address may have multiple serviceable address reference points 600 (and corresponding reference geocodes), information/data about the points (e.g., longitude and latitude information/data) described above and various other points for serviceable addresses can be collected and/or stored in a record corresponding to the serviceable address such as the record shown in FIG. 10. For instance, such records and information/data may be stored as information/data in a digital map.

In embodiment, a particular serviceable address reference point 600 may be the average or mean of one or more geocode samples collected (e.g., longitude and latitude information/data) for a single reference point 600 for the serviceable address, such as the average of multiple known parking points or the average of multiple known front door points. In another embodiment, a particular serviceable address reference point 600 may be the average or mean of one or more geocode samples collected (e.g., longitude and latitude information/data) for multiple reference points 600 for the serviceable address, such as the average of multiple known parking points combined with multiple known front door points or the average of all known reference points 600. As will be recognized, a variety of approaches and techniques can be used to determine and use serviceable address references points and their corresponding reference geocodes to adapt to various needs and circumstances.

c. Collecting Information/Data about Serviceable Addresses and Reference Points

In one embodiment, information/data associated with serviceable addresses and the different reference points 600 for serviceable addresses can be collected, identified, determined, and/or stored using a variety of techniques and approaches. For example, information/data regarding serviceable address reference points 600 may be base information/data provided by a digital map vendor or may include the digital map vendor's base information/data combined with geo coordinates (e.g., provided by a third party). Such information/data about these points may be collected using various methods. For example, such information/data may be collected via the information/data collection entity 130 and/or the mobile computing entity 145 (with or without the aid of the driver of the vehicle 100) and/or determined by using methods such as interpolation.

1. Regular, Manual, or Triggered Collection

In one embodiment, the information/data collection entity 130 or mobile computing entity 145 can provide the functionality to maintain and/or process telematics information/data (including location information/data comprising geo coordinate samples) for serviceable addresses that are visited, for example, based on items/shipments that are delivered to or picked up from the serviceable address. In one embodiment, the mobile computing entity 145 can be adapted to be used to collect telematics information/data (including location information/data comprising geo coordinate samples) at each serviceable address visited. More specifically, the mobile computing entity 145 can be configured to collect telematics information/data (including location information/data comprising geo coordinate samples) regularly, periodically, and/or continuously or upon determining the occurrence of one or more predefined trigger events. Such predefined trigger events may include, but are not limited to: (1) a scan/read event; (2) an electronic signature capture event; (3) an input to the mobile computing entity 145 indicating that a driver is at a particular serviceable address; (4) an input or event that indicates to the mobile computing entity 145 that an item/shipment has been picked up from or delivered to the serviceable address; (5) an input specifically instructing the mobile computing entity 145 to capture a sample; (6) when the mobile computing entity 145 determines that the vehicle 100 (or driver walking with the mobile computing entity 145) has entered or exited the street network; (7) when the vehicle 100 is placed in the park position; (8) ignition of the vehicle 100; and/or (8) the like. Thus, for visits to each serviceable address or reference points 600 at serviceable address, one or more geo coordinate samples (e.g., telematics information/data including location information/data) may be collected by the mobile computing entity 145 in response to various trigger events.

In another embodiment, the information/data collection entity 130 can collect telematics information/data (including location information/data comprising geo coordinate samples) on a periodic, regular, and/or continuous basis. For example, the information/data collection entity 130 can continuously collect telematics information/data (including location information/data comprising geo coordinate samples) as the vehicle 100 traverses street networks and/or visits serviceable addresses. Moreover, the information/data collection entity 130 can also be configured to collect telematics information/data (including location information/data comprising geo coordinate samples) in response to predefined trigger events, such as the vehicle 100 exiting or entering a street network, the ignition of the vehicle 100, and/or those discussed above with respect to the mobile computing entity 145.

As indicated, in one embodiment, the mobile computing entity 145 or information/data collection entity 130 can be configured to continuously and/or periodically store telematics information/data (including location information/data comprising geo coordinate samples), regardless of whether a trigger event has occurred. This may be beneficial since geo coordinates may not always be available at any particular time since, for example, a GPS signal could be temporarily blocked by a nearby obstruction. Thus, for instance, if a trigger event occurs at a time when a geo coordinate is not immediately obtainable, the last known geo coordinate (or in some embodiments the next geo coordinate) can be used. In such embodiments, the mobile computing entity 145 or information/data collection entity 130 may store information/data about the time of the geo coordinate sample and the time of the associated trigger event so that the carrier computing entity 110 may use the information/data in determining the accuracy of the telematics information/data (including location information/data comprising geo coordinate samples) and coordinating the same.

In one embodiment, information/data regarding a serviceable address and reference points 600 for the serviceable address can be transmitted to the carrier computing entity 110, which, after sufficient telematics information/data (including location information/data comprising geo coordinate samples) has been collected for the serviceable address or reference points 600 at the serviceable address, processes the information/data (e.g., sample geo coordinates) and stores information/data about the points in a record for the corresponding serviceable address. For example, the carrier computing entity 110 may be configured to require two, three, or more consistent sample geo coordinates for a particular reference point 600 associated with a serviceable address or reference points 600 at a serviceable address before computing a reference geocode and storing the information/data for the point in a record for the serviceable address—see FIG. 10. Also, it should be noted that the mobile computing entity 145 or information/data collection entity 130 may receive information/data about reference points 600 for serviceable addresses as input from the driver of the vehicle 100. Regardless, the carrier computing entity 110 can store reference point information/data for each serviceable address in a record for the serviceable address, such as shown in FIG. 10.

2. Geofence-Based Collection

In one embodiment, geofences can be used to collect telematics information/data (including location information/data comprising geo coordinate samples) at each serviceable address visited. In one embodiment, a computing entity (e.g., carrier computing entity 110) may define one or more geofences around geographic areas, such as serviceable addresses. The geofences may be defined to surround a defined geographic area, such as surrounding countries, regions, states, counties, cities, towns, interstates, roads, streets, avenues, toll roads, zip codes, area codes, ways, exit and entrance ramps, delivery routes, bus routes, taxis routes, industrial parks, neighborhoods, off-road areas (e.g., areas without paved roads), private land areas, houses, office, buildings, parking areas, parcels, delivery areas, private roads, driveways, serviceable addresses, plots of land, tracts of land, and/or the like. The geofences may be defined, for example, by the latitude and longitude coordinates associated with various points along the perimeter of the geographic area. Alternatively, geofences may be defined based on latitude and longitude coordinates of the center, as well as the radius, of the geographic area. The geographic areas, and therefore the geofences, may be any shape including, but not limited to, a circle, square, rectangle, an irregular shape, and/or the like. Moreover, the geofenced areas need not be the same shape or size. Accordingly, any combination of shapes and sizes may be used in accordance with embodiments of the present invention. Similarly, a geofence may overlap or reside wholly within another geofence. For example, a geofence of a parking area, for instance, may have geofences defined around stores or businesses in the parking area.

In one embodiment, after the one or more geofenced areas (e.g., geofences) have been defined, the location of the vehicle 100 can be monitored. Generally, the location of the vehicle 100 can be monitored by any of a variety of computing entities, including the information/data collection entity 130, the mobile computing entity 145, and/or the carrier computing entity 110. For example, as noted above, the vehicle's 100 location at a particular time may be determined with the aid of location-determining devices, location sensors 120 (e.g., GNSS sensors), and/or other telemetry location services (e.g., cellular assisted GPS or real time location system or server technology using received signal strength indicators from a Wi-Fi network). By using the vehicle's 100 location, a computing entity (data collection entity 130, mobile computing entity 145, or carrier computing entity 110) can determine, for example, when the vehicle 100 enters a defined geofence.

In one embodiment, in response to (e.g., after) a determination that a vehicle 100 has entered a defined geofenced area (such as a street network), a computing entity (e.g., the information/data collection entity 130, mobile computing entity 145, or carrier computing entity 110) can collect, identify, and/or store/record relevant telematics information/data. For example, the information/data collection entity 130 can collect, identify, and/or store/record telematics information/data (including latitude, longitude, direction, altitude, geocode, course, position, time, and/or speed information/data) about the area being traversed while within the geofenced area. Similarly, the information/data collection entity 130 can collect, identify, and/or store/record telematics information/data about where a delivery or pickup is made within the geofenced area. As will be recognized, a variety of other information/data (e.g., telematics information/data) can also be collected, identified, and/or stored/recorded, such as speed information/data, geofenced area information/data (e.g., the triggering geofence), emissions information/data, engine information/data, tire pressure information/data, oil pressure information/data, idle information/data, meteorological information/data, image information/data, and/or the like. In one embodiment, the collected geocode and/or telematics information/data can be routinely, periodically, and/or continuously transmitted to, for example, the carrier computing entity 110.

In one embodiment, after the vehicle 100 has entered the geofenced area, the location of the vehicle 100 can continue to be monitored by any of a variety of computing entities. By using the vehicle's 100 location, a computing entity can determine, for example, when the vehicle 100 exits the defined geofenced area to stop recording of the data. As described, this may include using location-determining devices, location sensors 120 (e.g., GNSS sensors), or other telemetry location services (e.g., cellular assisted GPS or real time location system or server technology using received signal strength indicators from a Wi-Fi network).

In another embodiment, in response to (e.g., after) a determination that a vehicle 100 has exited a defined geofenced area (such as a street network), a computing entity (e.g., the information/data collection entity 130, mobile computing entity 145, or carrier computing entity 110) can collect, identify, and/or store/record relevant data. For instance, the information/data collection entity 130 can collect, identify, and/or store/record telematics information/data (including latitude, longitude, location, direction, altitude, geocode, course, position, time, and/or speed data) about the area being traversed outside the geofenced area. Similarly, the information/data collection entity 130 can collect, identify, and/or store/record telematics information/data about where a delivery or pickup is made outside the geofenced area. As described, a variety of other information/data (e.g., telematics information/data) can also be collected, identified, and/or stored/recorded, such as speed information/data, emissions information/data, geofenced area information/data (e.g., the triggering geofence), RPM information/data, tire pressure information/data, oil pressure information/data, idle information/data, meteorological information/data, and/or the like. Moreover, the collected geocode and/or telematics information/data can be routinely, periodically, and/or continuously transmitted to, for example, the carrier computing entity 110. Such collected information/data can then be stored in records and/or as information/data in a digital map, for example.

In one embodiment, information/data regarding a serviceable address and reference points 600 for the serviceable address can be transmitted to the carrier computing entity 110, which, after sufficient telematics information/data (including location information/data comprising geo coordinate samples) has been collected for the serviceable address or reference points 600 at the serviceable address, processes the information/data (e.g., sample geo coordinates) and stores information/data about the points in a record for the corresponding serviceable address. For example, the carrier computing entity 110 may be configured to require two, three, or more consistent sample geo coordinates for a particular reference point 600 associated with a serviceable address or reference points 600 at a serviceable address before computing a reference geocode and storing the information/data for the point in a record for the serviceable address—see FIG. 10. Also, it should be noted that the mobile computing entity 145 or information/data collection entity 130 may receive information/data about reference points 600 for serviceable addresses as input from the driver of the vehicle 100. Regardless, the carrier computing entity 110 can store reference point information/data for each serviceable address in a record for the serviceable address, shown in FIG. 10.

d. Zones of Confidence

With one or more serviceable address reference points 600 (and corresponding reference geocodes), the carrier computing entity 110 can define, determine, identify, and/or similar words used herein interchangeably one or more zones of confidence 610 for the serviceable address and/or the serviceable address reference points 600 (and corresponding reference geocodes)—Block 1100 and 1105 of FIG. 11. As described above, the zones of confidence 610 can be based on the classification for the geographic area surrounding the serviceable address and be used to determine whether items/shipments are being or have been delivered to the appropriate serviceable address.

Figure 6:
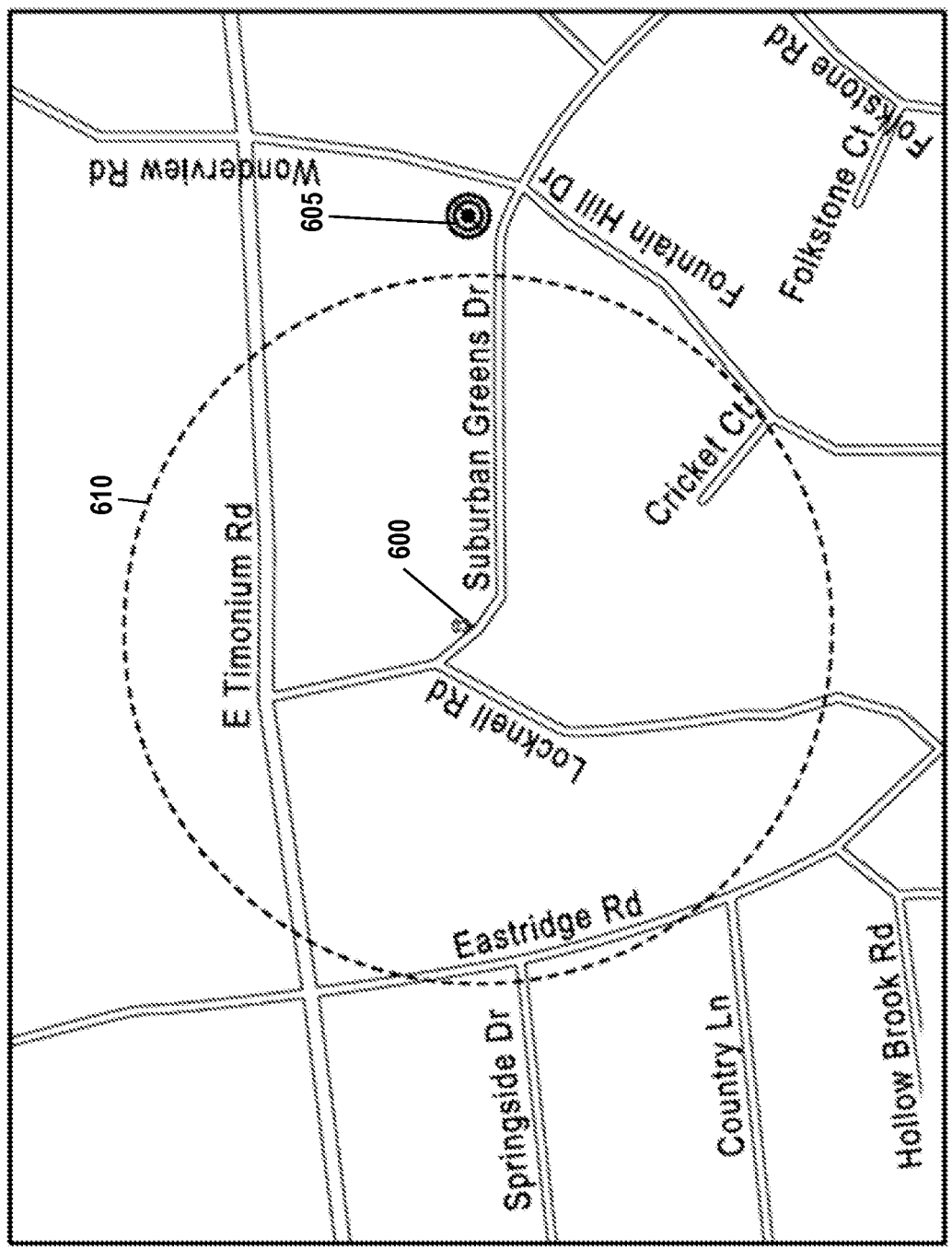
Figure 7:
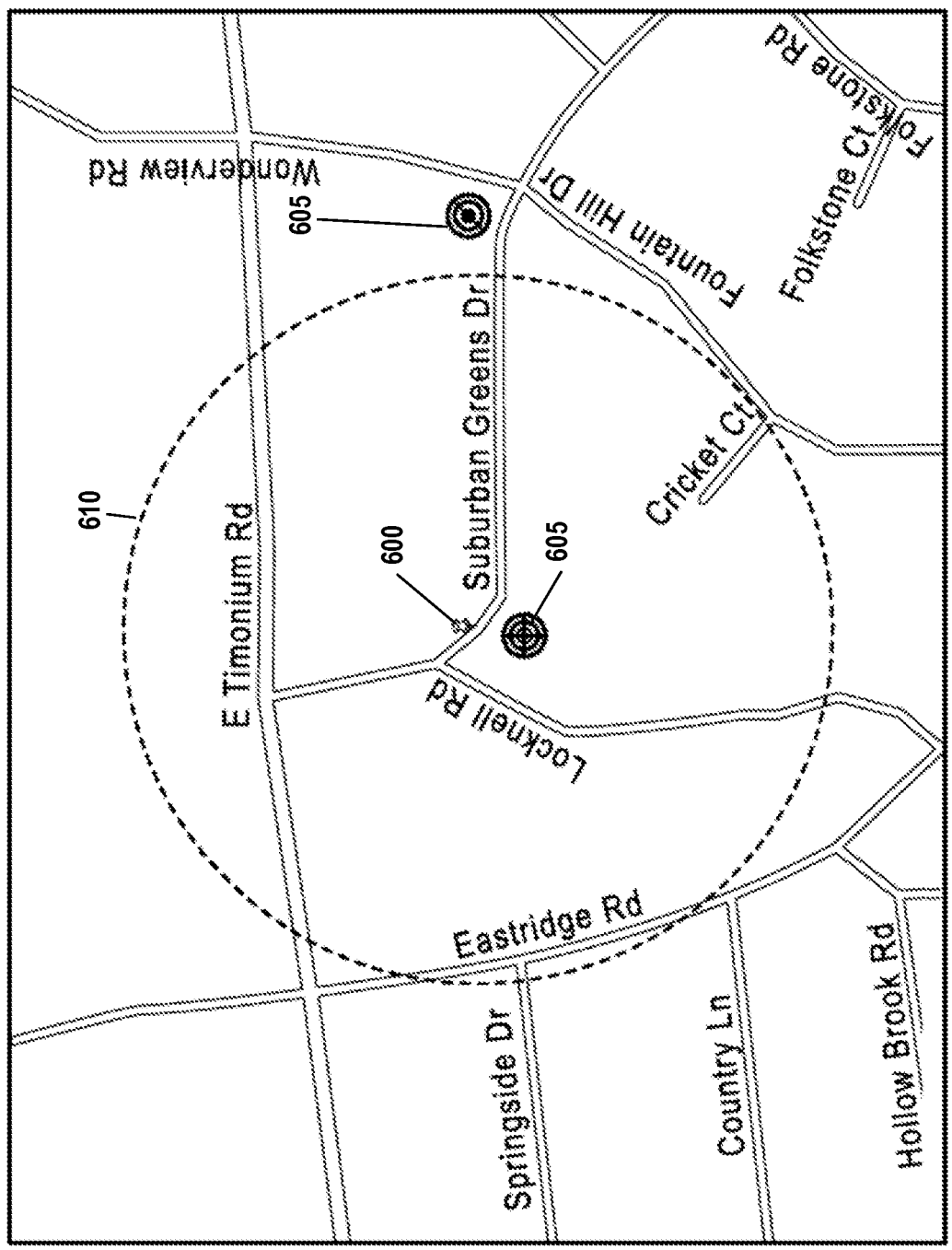
Figure 8:
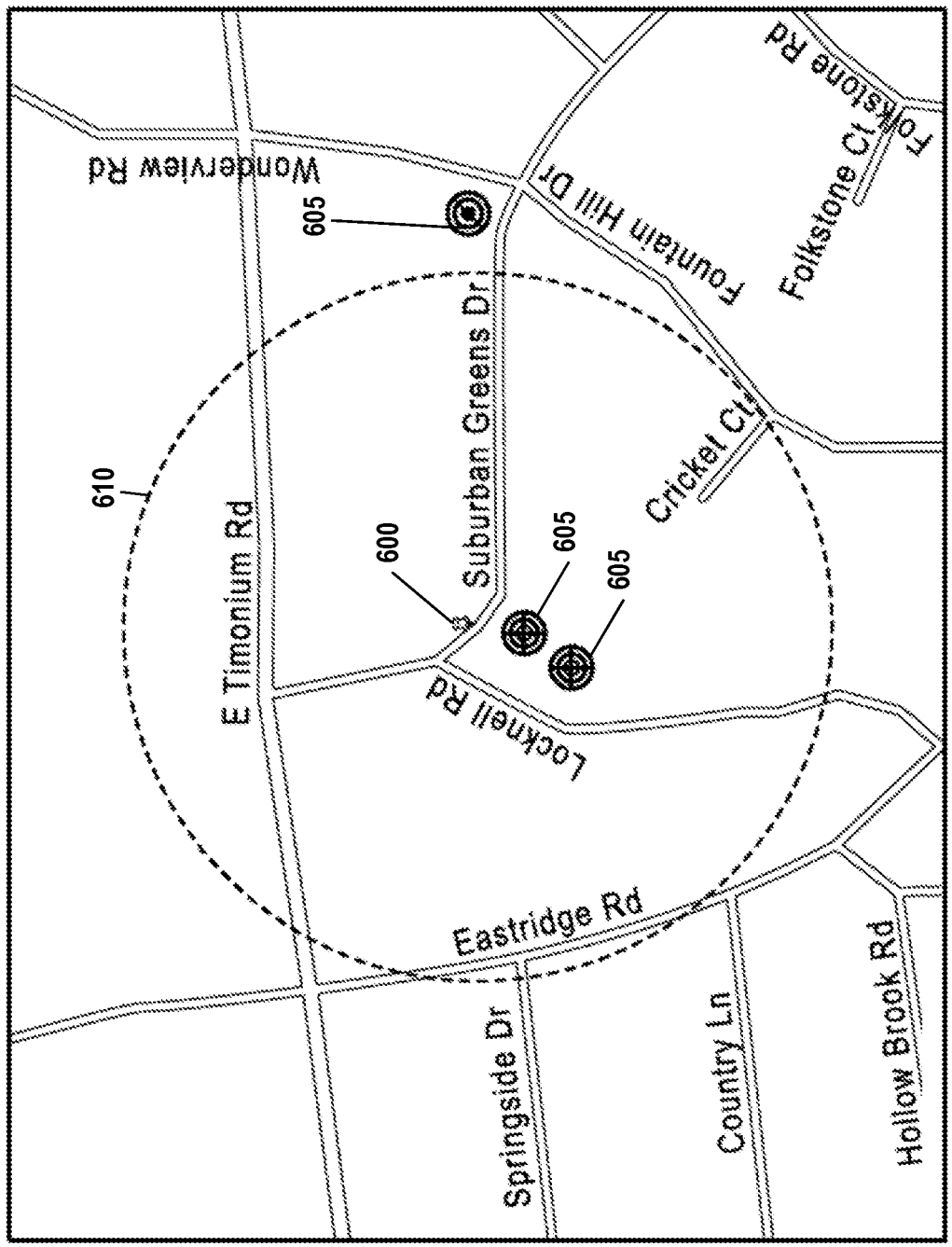

FIGS. 6-8 show a zone of confidence 610 defined around a serviceable address or a reference point 600 at the serviceable address: 105 Suburban Greens Drive, Center City, Ga. 11112. The zone of confidence 610 shown in FIGS. 6-8 can define an area or zone within which delivery of an item/shipment is considered acceptable (e.g., if delivery occurs within this zone, it is assumed that the item/shipment is being delivered to the correct address). And as noted, zones of confidence 610 may vary based on the corresponding classification for the geographic area of the serviceable address: super urban, urban, suburban, rural, super rural, and/or the like (Block 1100 of FIG. 11). As shown in FIG. 6, the zone of confidence 610 may be circular. However, in other embodiments, a non-circular shaped zone of confidence 610 could be used if logistically appropriate. For example, zones of confidence 610 may be any shape including, but not limited to, a circle, a square, a rectangle, a polygon, an irregular shape, and/or the like. Accordingly, any combination of shapes and sizes may be used in accordance with embodiments of the present invention. Different shapes can be achieved by, for example, defining appropriate metrics in association with the reference geocode assigned to or associated with the current delivery address. A zone of confidence 610 may be defined based on latitude and longitude coordinates of the center, as well as the radius, of a serviceable address or a serviceable address reference point 600 (e.g., around the corresponding reference geocode). Alternatively, the zone of confidence 610 may be defined, for example, by the latitude and longitude coordinates associated with serviceable address or a serviceable address reference point 600 (e.g., around the corresponding reference geocode).

Moreover, zones of confidence 610 may vary based on the corresponding classification for the geographic area. For example, geographic areas may be classified as super urban, urban, suburban, rural, super rural, and/or the like. In one embodiment, a zone of confidence 610 may be a specific number of feet, meters, yards, and/or other distance/tolerance from a serviceable address or a reference point 600 at the serviceable address based on the classification. The below classifications and distances/tolerances are merely provided for illustrative purposes and are not limiting to embodiments of the present invention.

TABLE 1

| | Zone of Confidence |
|---|---|
| Super Urban | .9 meters |
| Urban | 1.7 meters |
| Suburban | 2.5 meters |
| Rural | 62 meters |
| Super Rural | 250 meters |

In another embodiment, the zone of confidence 610 may be a distance/tolerance calculation from a serviceable address or a reference point 600 at a serviceable address (e.g., ±0.000001, ±0.000001 of 33.78691262, −84.38756068). As will be recognized, one or more zones of confidence 610 can be defined for a particular serviceable address and/or a particular reference point 600 at a serviceable address. Thus, a serviceable address may be associated with one or more zones of confidence 610 to adapt to various needs and circumstances.

e. Location Events for Shipments

As previously described, a customer (e.g., operating customer computing entity 112) may access a retailer computing entity 105 (e.g., Amazon (www.amazon.com), Target (www.target.com), and/or the like) and purchase an item/shipment to be delivered to the customer. The retailer (e.g., via the retailer computing entity 105) can then initiate shipment of the item/shipment, shipment, package, parcel, freight, and/or similar words used herein interchangeably to the customer via a carrier. The carrier can transport the item/shipment to the customer and track the movements of the item/shipment through the carrier's transportation and logistics network.

To track the movement of the item/shipment through the carrier's transportation and logistics network, the carrier computing entity 110 can store shipping information/data about the item/shipment being transported (e.g., the weight of the shipment, the number of pieces in the shipment, the contents of the shipment, the class of the shipment, the date the item/shipment is picked up from the consignor, the date the item/shipment is to be delivered to the consignee, consignor information, consignee information, regulatory information, the delivery service level, the unique identifier, location events 605, and/or the like). For example, as location events 605 occur that are related to the shipment, the carrier computing entity 110 (in coordination with other appropriate computing entities, such as the mobile computing entity 145) can update the shipping information/data in a record for the item/shipment. As will be recognized, the term "location event" is used generically to indicate that information/data regarding the location of the item/shipment may be received. In other words, a location event 605 does not necessarily connote that the item/shipment is being moved, but that information/data regarding its location may be received as input (whether manually, semi-automatically, or automatically). Such location events 605 may be events identifying the location of the item/shipment at various points during the process of transportation of the item/shipment through the carrier's transportation and logistics network, such as (1) scan events, (2) electronic signature capture events, (3) events indicating that an item/shipment has been delivered, (4) events indicating the mobile computing entity 145 captured a geocode sample representing the location of an item; (5) events indicating where an item/shipment was delivered, and/or (6) the like. In one embodiment, there may be multiple location events 605 associated with the serviceable address for an item/shipment.

In one embodiment, at or proximate a serviceable address to which an item/shipment is to be delivered, carrier/delivery personnel of the carrier (e.g., operating a mobile computing entity 145) may scan the item/shipment about to be delivered (e.g., scan the unique identifier). At that time, the mobile computing entity 145 may collect a geocode sample and transmit the geocode sample to the carrier computing entity 110 for storage in association with the corresponding unique identifier and the corresponding scan. Assume the carrier/delivery personnel (e.g., operating a mobile computing entity 145) scans an item/shipment to be delivered to 105 Suburban Greens Drive, Center City, Ga. 11112 (e.g., having a reference point 600 at 33.78691262, −84.38756068). The carrier/delivery personnel (e.g., operating a mobile computing entity 145) may perform an initial scan after arriving at the serviceable address. The information/data sent from the mobile computing entity 145 to the carrier computing entity 110 may indicate that an initial scan was performed at 33.7869124, −84.3875610 at 2013-11-09 T 15:13:17 UTC. When the carrier/delivery personnel delivers the item/shipment to 105 Suburban Greens Drive, Center City, Ga. 11112, the carrier/delivery personnel (e.g., operating a mobile computing entity 145) may indicate where the item/shipment was left at the serviceable address. For instance, the information/data sent from the mobile computing entity 145 to the carrier computing entity 110 may indicate that the item/shipment was left at the side door located at 33.7869130, −84.3875609 at 2013-11-09 T 15:14:01 UTC. The carrier/delivery personnel may then indicate that the delivery stop at the serviceable address has been completed and input the same via the mobile computing entity 145. For instance, the information/data sent from the mobile computing entity 145 to the carrier computing entity 110 may indicate that the delivery stop for 105 Suburban Greens Drive, Center City, Ga. 11112 was completed at 33.7869133, −84.3875604 at 2013-11-09 T 15:14:01 UTC. As will be recognized, a variety of other approaches and techniques can be used to adapt to various needs and circumstances. For instance, both the mobile computing entity 145 and the information/data collection entity 130 may be used to collect information/data as described above. Moreover, the mobile computing entity 145 and the information/data collection entity 130 may also be able to collect information/data for the item/shipment as described above with regard to the serviceable address and corresponding reference points 600. As will be recognized, a variety of other approaches and techniques can be used to adapt to various needs and circumstances.

In one embodiment, after the recording and/collecting of information/data, an appropriate computing entity (e.g., mobile computing entity 145 or information/data collection entity 130) can transmit the information/data for the location events 605 to the carrier computing entity 110. After receipt, the carrier computing entity 110 can store the information/data for the location events 605 in association with shipping information/data (e.g., a record) for the item/shipment. In one embodiment, such information/data for location events 605 can be used to confirm whether the item/shipment was appropriately delivered to the serviceable address. As will be recognized, a variety of other approaches and techniques can be used to adapt to various needs and circumstances.

f. Determining if Delivery was within Zone of Confidence

In one embodiment, by using a reference point 600 for the serviceable address, one or more locations events that occurred at or near the serviceable address related to the delivery of an item/shipment, and a zone of confidence, the carrier computing entity 110 or retailer computing entity 105 (or other appropriate computing entity) can determine, identify, assign, associate, and/or similar words used herein interchangeably a configurable delivery confidence rating/indicator for delivery of the item/shipment (Block 1115 and 1120 of FIG. 11). The configurable delivery confidence rating/indicator may be used by the carrier as an indication of the level of confidence that the item/shipment was delivered to the correct serviceable address.

TABLE 2

| Confidence Indicator | Location Events |
|---|---|
| Undetermined | 0 |
| Low | 1 |
| Medium | 2 |
| High | >3 |

Figure 9:
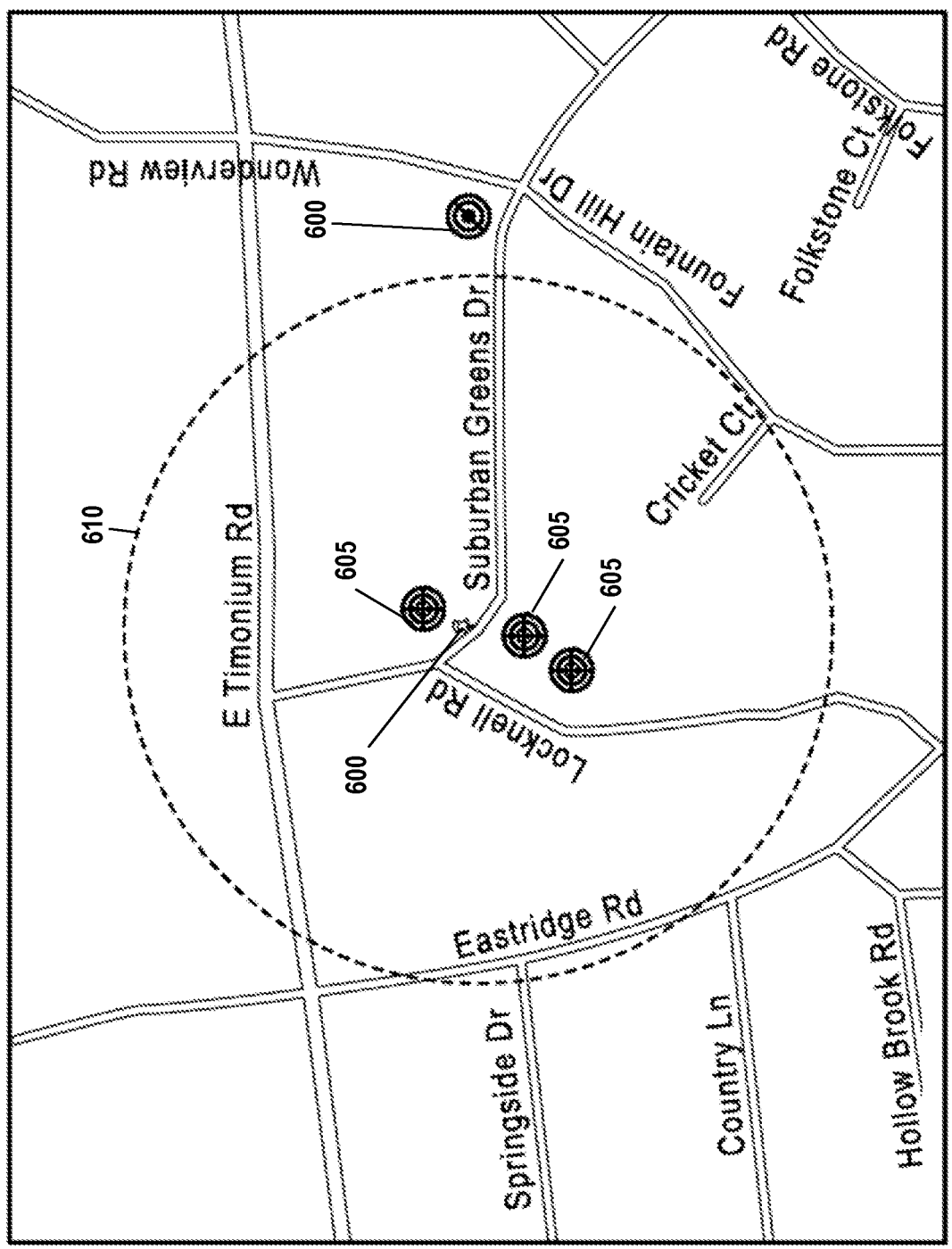

As indicated in Table 2 above, the configurable delivery confidence rating/indicator may vary to adapt to a variety of needs and circumstances. For example, there may be multiple delivery confidence indicators each associated with a configurable threshold of location events. In the above example, the there four difference delivery confidence indicators, with each being associated with a configurable threshold of location events. For instance, for an item/shipment delivered to a serviceable address, no location events 605 within a zone of confidence 610 for a serviceable address may indicate an "Underdetermined Confidence" level that the item/shipment was delivered to the appropriate serviceable address—see FIG. 6. As shown in FIG. 3, the one more location events 605 for delivering the item/shipment were outside of the zone of confidence 610. One location event 605 within a zone of confidence 610 for a serviceable address may indicate a "Low Confidence" level that the item/shipment was delivered to the appropriate serviceable address—see FIG. 7. As shown in FIG. 7, there is one location event 605 within the corresponding zone of confidence 610. Two location events 605 within a zone of confidence 610 for a serviceable address may indicate a "Medium Confidence" level that the item/shipment was delivered to the appropriate serviceable address—see FIG. 8. As shown in FIG. 8, there are two location events 605 within the corresponding zone of confidence 610. And three or more location events 605 within a zone of confidence 610 for a serviceable address may indicate a "High Confidence" level that the item/shipment was delivered to the appropriate serviceable address see FIG. 9. FIG. 9 shows three location events 605 within the corresponding zone of confidence 610.

As will be recognized, a variety of other techniques and approaches can be used to adapt to various needs and circumstances. For example, a high confidence rating/indicator may be two more location events within the zone of confidence. A medium confidence rating/indicator may be one location event within a zone of confidence. And an undetermined confidence rating/indicator may be no readings within the zone of confidence.

In one embodiment, to determine if a location event 605 is within a zone of confidence 610 based on the zone of confidence for the serviceable address (Block 1110 of FIG. 11), such a process may include comparing the geocode information/data for the location events 605 for the item/shipment to the geocode information/data for one or more reference points 600 for the serviceable address. This determination may be performed by a variety of computing entities, including the carrier computing entity 110 and/or the retailer computing entity 105 on a periodic, regular, or continuous basis and/or in response to certain trigger events. As will be recognized, the size and shape of the zone of confidence 610 may vary based on the geographic classification for the serviceable address (e.g., super urban, urban, suburban, rural, super rural). Thus, determining the zone of confidence may first require identifying the appropriate geographical classification that may affect the acceptable distance/tolerance for the delivery.

In one embodiment, after determining/identifying the confidence rating/indicator for delivery of an item/shipment, the carrier computing entity 110 can store, associate, or assign the confidence rating/indicator for delivery to the unique item/shipment identifier for the item/shipment (Block 1120 of FIG. 11). This will enable the carrier computing entity 110 and/or the retailer computing entity 105 to access and/or retrieve the confidence rating/indicator for delivery of the item/shipment using the unique item/shipment identifier. For example, the carrier computing entity 110 can provide customers and retailers with configurable delivery confidence indicators representative of the confidence levels of the carrier that items/shipments were delivered to the proper serviceable addresses. Such information/data can be provided by the carrier computing entity 110 in a variety of ways, including via one or more application programming interfaces (APIs) that receive and respond to requests for configurable delivery confidence indicators for one or more shipments or via a retailer or customer application, browser, or user interface. Retailers may then use such information/data to suggest that a specific customer, for example, perform additional research as to where an item/shipment might be if the customer believes the item/shipment was not delivered by the carrier.

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method comprising:
obtaining, via one or more processors, a plurality of geo coordinate samples detected by a location sensor associated with a vehicle on a route to a serviceable address for delivery of an item, wherein at least one of the plurality of geo coordinate samples are collected in response to one or more location events, and wherein the one or more location events include at least one location event from a group of location events consisting of: the vehicle exiting or entering a street network, the vehicle being in a parked position, and ignition of the vehicle
in response to the obtaining of the plurality of geo coordinate samples, determining, via the one or more processors, whether each of the plurality of geocoordinate samples occurred within a zone of confidence;
in response to the determining, computing, via the one or more processors, a quantity of the location events that have occurred within the zone of confidence, the zone of confidence is indicative of a geographical area within which delivery of the item is acceptable;
computing, via the one or more processors, a confidence rating for delivery of the item to the serviceable address based at least in part on the quantity of the location events exceeding or not exceeding a configurable threshold within the zone of confidence, the confidence rating corresponding to a calculated level of confidence that the item is delivered to a correct serviceable address; and
in response to the computing of the confidence rating, provide, over a computer network, a user interface that includes the confidence rating.

2. The method of claim 1, wherein the zone of confidence is generated based on a classification of a geographic area surrounding the serviceable address.

3. The method of claim 1, wherein the zone of confidence includes a plurality of addresses, and wherein in response to delivering the item within the zone of confidence at any location, an inference is made that the item is delivered to the serviceable address.

4. The method of claim 1, wherein the zone of confidence is determined based on the serviceable address being in an urban or rural environment.

5. The method of claim 1, wherein the zone of confidence is a distance calculation from the serviceable address.

6. The method of claim 1, wherein the triggering action one or more location events includes a scan event of the item proximate to the serviceable address.

7. The method of claim 1, further comprising generating a confidence indicator indicative of a confidence level that a location event, of the one or more location events, occurred within the zone of confidence.

8. An apparatus comprising at least one processor and at least one memory including program code, the at least one memory and the program code configured to, with the processor, cause the apparatus to at least:
at least partially in response to an occurrence of one or more location events, obtain, over a computer network, a plurality of geo coordinate samples generated at least in part by a location sensor affixed to the vehicle, the plurality of geo coordinate samples being generated during a single visit, by the vehicle, to a serviceable address for delivery of an item, the geo coordinate samples including longitude and latitude coordinates;
in response to the obtaining of the plurality of geo coordinate samples, determining, via the at least one processors, whether each of the plurality of geocoordinate samples occurred within a zone of confidence;
in response to the determining, computing a quantity of the one or more location events that have occurred within the zone of confidence defined for the serviceable address;
determine a confidence rating for delivery of the item to the serviceable address based at least in part on the quantity exceeding or not exceeding a configurable threshold within the zone of confidence; and
assign the confidence rating to the delivery of the item to the serviceable address.

9. The apparatus of claim 8, wherein the confidence rating is provided, via an Application Programming Interface (API), to a customer application or retailer application on a computing device.

10. The apparatus of claim 9, wherein the retailer application, based on the confidence rating suggest that a specific customer perform additional research as to where the item is located in response to the confidence rating being below a threshold.

11. The apparatus of claim 8, generating a high, medium, or low confidence rating based on the quantity of the plurality of geo coordinate samples that are within the zone of confidence.

12. The apparatus of claim 8, wherein a size and shape of the zone of confidence is determined based a geographic location for the serviceable address.

13. The apparatus of claim 8, wherein the item is tracked based on a weight of the item, a quantity of pieces in the item, contents of the item, a class of shipment, and a date of shipment.

14. The apparatus of claim 8, wherein the zone of confidence corresponds to a geo-fence that surrounds a plurality of street segments.

15. A computer program product comprising at least one non-transitory computer-readable storage medium having computer-readable program code portions stored therein, the computer-readable program code portions comprising:
an executable portion configured to receive a plurality of geo coordinate samples collected during a visit to a serviceable address for delivery of an item, wherein at least one of the plurality of geo coordinate samples collected via at least one of: a location sensor, a telemetry location service device, and a location-determining device;
based at least in part on the plurality of geo coordinate samples collected during the visit, determining whether each of the plurality of geocoordinate samples occurred within a zone of confidence;
based at least in part on the determining, an executable portion configured to compute a quantity of location events that occurred within the zone of confidence, the location events are indicative of computer-generated inputs that occur at various geographical points during a process of transporting the item through a logistics network, the zone of confidence corresponding to a particular geographical classification;
based at least in part on the quantity exceeding or not exceeding a configurable threshold within the zone of confidence, an executable portion configured to calculate a confidence rating for delivery of the item to the serviceable address; and
in response to the computing of the confidence rating, provide, over a computer network, a user interface that includes the confidence rating.

16. The computer program product of claim 15, wherein the location events include: a scan event, an electronic signature capture events, and events indicating that the item has been delivered.

17. The computer program product of claim 15, wherein the location events include events indicating a mobile computing entity captured a geocode sample.

18. The computer program product of claim 15, wherein the zone of confidence surrounds a street network.

19. The computer program product of claim 15, wherein the location events include: ignition of a vehicle, the vehicle being in a parked position, the vehicle entering or exiting a street network.

20. The computer program product of claim 15, wherein the location events include: an instruction instructing a mobile computing entity to capture a geo coordinate sample of the plurality of geo coordinate samples, and an input to the mobile computing entity indicating that a driver is at the serviceable address.

* * * * *